(12) United States Patent
Degrieck et al.

(10) Patent No.: US 9,847,697 B2
(45) Date of Patent: Dec. 19, 2017

(54) WAVE ENERGY CONVERTOR

(71) Applicant: UNIVERSITEIT GENT, Ghent (BE)

(72) Inventors: Joris Degrieck, Aalter (BE); Wim Van Paepegem, Zwijnaarde (BE)

(73) Assignee: UNIVERSITEIT GENT, Ghent (BE)

( * ) Notice: Subject to any disclaimer, the term of this patent is extended or adjusted under 35 U.S.C. 154(b) by 0 days.

(21) Appl. No.: 15/334,847

(22) Filed: Oct. 26, 2016

(65) Prior Publication Data

US 2017/0047820 A1 Feb. 16, 2017

Related U.S. Application Data

(66) Continuation-in-part of application No. 15/029,549, filed as application No. PCT/EP2014/071180 on Oct.
(Continued)

(30) Foreign Application Priority Data

Oct. 15, 2013 (EP) ..................................... 13188653

(51) Int. Cl.
*F03B 13/10* (2006.01)
*F03B 13/12* (2006.01)
(Continued)

(52) U.S. Cl.
CPC .......... *H02K 7/1853* (2013.01); *F03B 13/14* (2013.01); *H02K 7/025* (2013.01); *H02K 11/30* (2016.01);
(Continued)

(58) Field of Classification Search
USPC ............................................. 290/1 C, 43, 53
See application file for complete search history.

(56) References Cited

U.S. PATENT DOCUMENTS

| 9,759,135 B2 * | 9/2017 | Ulrey ...................... F02D 13/02 |
| 2017/0234291 A1 * | 8/2017 | Noia ........................ F03B 13/20 |
| | | 290/53 |
| 2017/0271957 A1 * | 9/2017 | Hanumalagutti ........ H02K 9/19 |

FOREIGN PATENT DOCUMENTS

| EP | 0120654 A1 | 10/1984 |
| WO | 2006118482 A1 | 11/2006 |

(Continued)

OTHER PUBLICATIONS

Extended European Search Report for corresponding European Application 13188653.3, dated Mar. 31, 2014.
(Continued)

*Primary Examiner* — Pedro J Cuevas
(74) *Attorney, Agent, or Firm* — Justin J. Cassell; Workman Nydegger

(57) ABSTRACT

A device and method for generating electric energy/power from a wave motion. The device comprises an input branch connected to a movable element, a secondary branch connected to a main electric generator, a power split transmission comprising a first mechanical port connected to the input branch, and a second mechanical port connected to a secondary branch, and a third port being a mechanical or electrical control port. The device further comprises a variable speed auxiliary electrical machine connected to the control port for mechanically or electrically controlling power distribution in the power split transmission. The device further comprises a control unit adapted for controlling the variable speed auxiliary electrical machine in such a way as to realize a one-way rotation of the main electric generator.

20 Claims, 13 Drawing Sheets

Related U.S. Application Data 2, 2014, now Pat. No. 9,784,238, Substitute for application No. PCT/EP2014/071110, filed on Oct. 1, 2014.

(51) Int. Cl.

| | | |
|---|---|---|
| *H02P 9/04* | (2006.01) | |
| *H02K 7/18* | (2006.01) | |
| *F03B 13/14* | (2006.01) | |
| *H02P 9/48* | (2006.01) | |
| *H02K 11/30* | (2016.01) | |
| *H02K 7/02* | (2006.01) | |
| *H02K 51/00* | (2006.01) | |
| *H02K 99/00* | (2014.01) | |
| *F02B 63/04* | (2006.01) | |
| *H02K 7/10* | (2006.01) | |
| *H02K 7/06* | (2006.01) | |

(52) U.S. Cl.
CPC ............. *H02K 51/00* (2013.01); *H02K 99/10* (2016.11); *H02P 9/48* (2013.01); *F05B 2220/706* (2013.01); *F05B 2260/40311* (2013.01); *H02K 7/06* (2013.01)

(56) References Cited

FOREIGN PATENT DOCUMENTS

| WO | 2007042847 A1 | 4/2007 |
|---|---|---|
| WO | 2011092555 A2 | 8/2011 |
| WO | 2011126451 A1 | 10/2011 |

OTHER PUBLICATIONS

International Search Report for corresponding International PCT Application No. PCT/EP2014/071180, dated Feb. 13, 2015.
Vantorre et al. "Modeling of Hydraulic Performance and Wave Energy Extraction by a Point Absorber in Heave," Applied Ocean Research, Sep. 28, 2004, pp. 61-72, vol. 26.
Hoeijmakers et al., "The Electrical Variable Transmission", IEEE Transactions on Industry Applications, vol. 42, No. 4, pp. 1092-1100, Aug. 2006.
Liu et al., "Electromagnetic Design and Analysis of Double-Rotor Flux-Modulated Permanent-Magnet Machines", Progress in Electromagnetics Research, vol. 131, 2012, pp. 81-97.
Liu et al., "Design Optimization of a Novel Doubly Fed Dual-Rotor Flux-Modulated Machine for Hybrid Electric Vehicles", IEEE Transactions on Magnetics, vol. 51, No. 3, 4 Pages, Mar. 2015.
Pisek et al., "Design Analysis and Experimental Validation of a Double Rotor Synchronous PM Machine Used for HEV", IEEE Transactions on Magnetics, vol. 49, No. 1, pp. 152-155, Jan. 2013.
Sun et al., "Optimal Design of Double-Layer Permanent Magnet Dual Mechanical Port Machine for Wind Power Application", IEEE Transactions on Magnetics, vol. 45, No. 10, pp. 4613-4616, Oct. 2009.
Niu et al., "A Novel Double-Stator Double-Rotor Brushless Electrical Continuously Variable Transmission System", IEEE Transactions on Magnetics, vol. 49, No. 7, pp. 3909-3912, Jul. 2013.

* cited by examiner

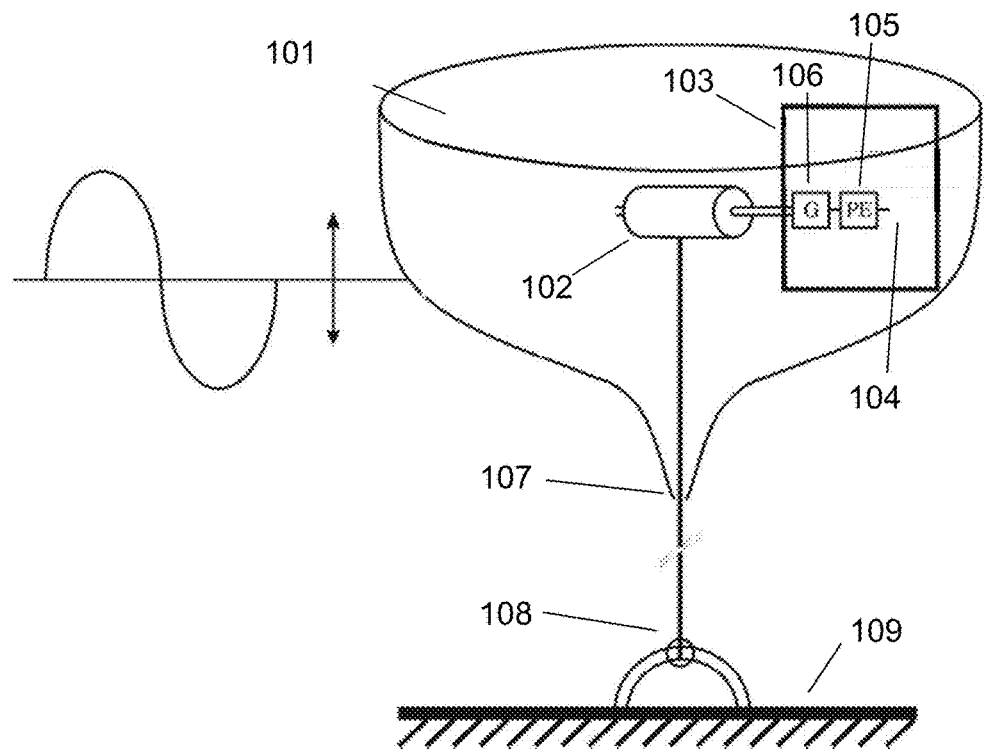
Fig. 1
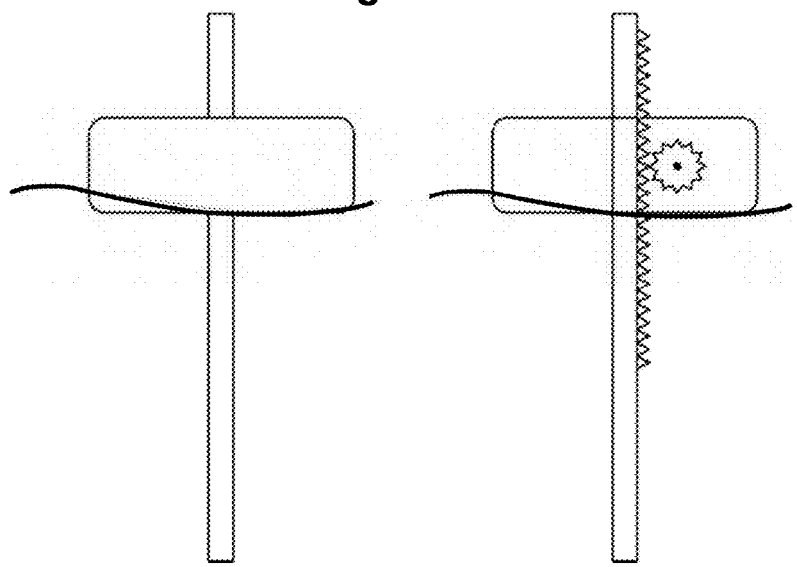
Fig. 2a  Fig. 2b

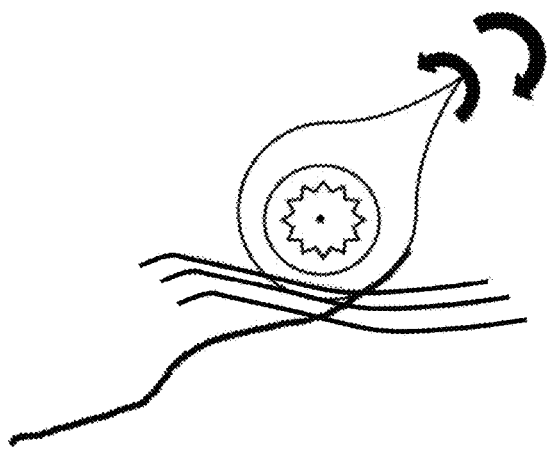
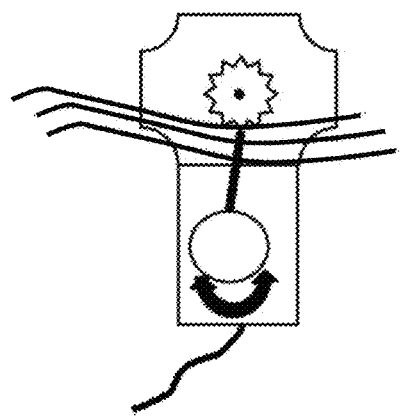
Fig. 5a                    Fig. 5b
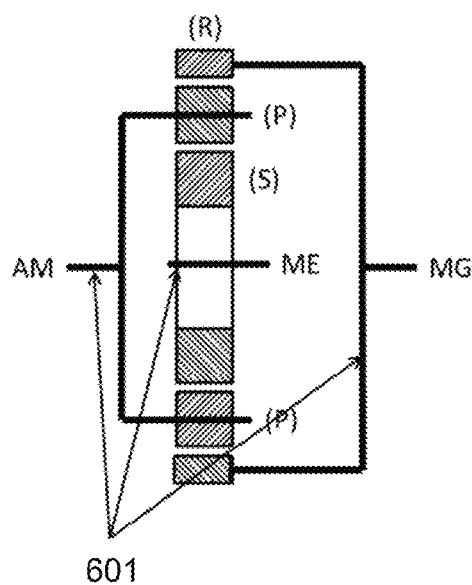
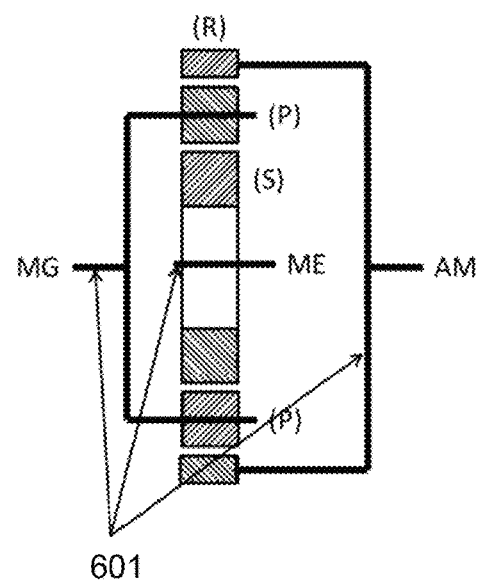
Fig. 6a                    Fig. 6b

WAVE ENERGY CONVERTOR

CROSS-REFERENCE TO RELATED APPLICATIONS

This application is a continuation-in-part of U.S. application Ser. No. 15/029,549, filed Apr. 14, 2016, the entirety of which is herein incorporated by reference.

FIELD OF THE INVENTION

The present invention relates to methods and systems for generating electric energy from wave motion. The present invention relates to methods and systems for converting a bidirectional movement caused by environmentally induced motion into a unidirectional rotary movement.

BACKGROUND OF THE INVENTION

Wave energy has a large potential to become an interesting and important cost efficient source of electrical power due to the high energy density of waves in the ocean. Furthermore, it is believed that wave energy is more predictable and more consistently available than wind power. The wave energy is captured by means of a wave energy converter (WEC).

A wave energy converter as used in this application is defined as a system for converting wave energy into electrical energy.

A number of different types of wave energy converters exist which are categorized based on their size, required water depth, working principle, . . . . Based on the method used to capture the energy of the waves, one may for instance distinguish between point absorbers or buoys, attenuators, terminator devices, oscillating water column devices and overtopping devices.

A wave energy converter comprises an element which is movable under the influence of the wave motion. A wave-induced movement of the buoy, or of the movable element in general, typically is a bidirectional movement or oscillatory movement or pendular movement, causing a mechanical shaft connected to the movable element to rotate alternatively in positive and negative direction. This mechanical shaft is then further connected to the rotor of an electrical machine operating as an electric generator. As such the mechanical energy can be transformed into electrical energy. The part of the WEC being responsible for transforming absorbed wave energy into electrical energy is typically referred to as the power-take-off (PTO) system of a WEC.

Efficiently transforming the energy comprised in the pendular or oscillatory movements of the movable element into electrical energy is hard. Indeed, such oscillatory movements cause the rotor of the electric generator to undergo a bidirectional rotational movement, i.e. to consecutively come to stand-still, to accelerate to a maximum rotation speed in a first direction, to decelerate and to come to stand-still once more, to accelerate to a maximum rotation speed in a second direction, opposite the first direction, to decelerate and to come to stand-still once more. As a consequence the control of such a machine becomes quite difficult on the one hand and on the other hand the electrical machine operates in conditions of torque and speed which are far off the nominal and optimal operating points.

Therefore, there have been several attempts to transform the oscillatory movement of the movable element in a unidirectional movement of the rotor of the generator. Such attempts include the use of special types of gearboxes such as planetary gearboxes as presented in e.g. WO2011/126451, WO2006/118482, WO2011/092555. All these examples use at least one, typically two clutches, freewheels or other anti-reverse mechanisms. Such clutches, freewheels and anti-reverse mechanisms are then continuously engaged and disengaged to ensure the wave-induced oscillatory movement is converted and inverted to realize a unidirectional movement of the rotor of the generator. However, the continuous engagement and disengagement of such freewheels or anti-reverse mechanisms cause mechanical losses in the PTO system as well does it cause the wave energy converter's PTO system to be prone to mechanical wear reducing its lifetime. Therefore, there is still a need for more efficient and/or more robust PTO systems.

In "The Electric Variable Transmission", IEEE Transactions on Industry Applications, Vol 42, No 4, pp. 1092-1100, July/August 2006, Martin J. Hoeijmakers and Jan A. Ferreira describe an electromechanical device referred to as "EVT". This publication is incorporated herein by reference in its entirety, and will be referred to herein as [Hoeijmakers]. The basic principles of the EVT will be briefly described below, in relation to FIG. 17 to FIG. 19, which are a replica of FIG. 2, FIG. 3 and FIG. 6 of said IEEE-publication.

SUMMARY OF THE INVENTION

It is an object of embodiments of the present invention to provide a device and method for generating electric energy from a wave motion in an efficient way. It is an advantage of embodiments of the present invention that electric energy can be generated from wave motion in a more efficient way than conventional prior art systems.

The above objective is accomplished by a device and method according to the present invention.

According to a first aspect, the present invention relates to a device for generating electric energy from a wave motion, the device being connectable to a movable element configured for performing an oscillatory movement under the influence of the wave motion, the device comprising: a main electric generator, an input branch operatively connectable to the movable element, the movable element, when connected to the input branch, being configured for imposing an oscillatory movement on the input branch as a result of the wave motion, the oscillatory movement being a periodic movement having a period wherein during alternating moments in time positive and negative speeds are imposed to the input branch, a secondary branch operatively connected to the main electric generator, a power split transmission comprising at least three ports, the at least three ports comprising: a first mechanical port connected to the input branch, a second mechanical port connected to the secondary branch, and a third port being a control port, the power split transmission being configured for distributing power between the at least three ports, characterized in that the device furthermore comprises a variable speed auxiliary electrical machine operatively connected to the control port for controlling power distribution in the power split transmission, and the device furthermore comprises a control unit configured for controlling the variable speed auxiliary electrical machine, in such a way as to realize a one-way rotation of the main electric generator during the whole period of the oscillatory movement.

It is an advantage of embodiments of the present invention that a wave motion which is a movement in substantially two different directions, e.g. a substantially upward and a substantially downward movement, as can be obtained for example using a rack and pinion or using a drum and a cable, is efficiently transferred to a one-directional rotational movement, e.g. without the need for continuously coupling and decoupling clutches.

The term "port of a power split transmission" is to be understood as a connection or interface of the power split transmission, e.g. a mechanical or electrical connection or interface, through which interface or via which connection power can be exchanged with the outside world, e.g. provided to the power split transmission, or extracted from the power split transmission.

The control port may be a mechanical port or an electrical port. Each of the ports may be a discrete port or an integrated or distributed or embedded port.

In particular embodiments, the control port is a discrete mechanical port. In other embodiments, the control port is an integrated electrical port.

The power split transmission exchanges energy (or power) between the ports. Power can be injected into the power split transmission via one or more ports, and power can be extracted from the power split transmission via one or more ports. If losses (e.g. mechanical losses due to friction, or electrical losses due to electrical resistance) are not taken into account and in the absence of storage components, the sum of the powers injected in all the ports is equal to zero.

In an embodiment, the control unit is configured for controlling power distribution of a positive power flow from the moveable element to the device in one part of a period of the oscillatory movement and of a negative power flow from the moveable element to the device in another part of the period of the oscillatory movement, during operation.

In an embodiment, said control unit is configured for performing said power distribution to and from any of the at least three ports of the power split transmission so as to shift the moments in time of imposing positive and negative speeds at the input branch with respect to the moments in time when positive or negative power flow from the movable element to the device occurs.

In embodiments according to the present invention, the angular velocity of the main electric generator can be predetermined.

In embodiments according to the present invention, the angular velocity of the main electric generator can be substantially constant over one period of the oscillatory movement.

In an embodiment, the control unit is configured for realising a predetermined torque of the movable element so as to generate the maximum amount of energy during the period of the oscillatory movement.

In an embodiment, the power split transmission comprises at least one planetary gear box comprising a sun gear, a ring gear and a planet gear.

In particular embodiments, the device comprises only one planetary gearbox.

In an embodiment, the power split transmission comprises at least one differential unit.

In an embodiment, the secondary branch comprises at least one mechanical energy storage device adapted for storing at some moments in time mechanical power and for providing at certain moments in time mechanical power.

In an embodiment, the mechanical energy storage device is a flywheel.

In an embodiment, the at least three ports of the power split transmission consist of one input port, one output port and one control port, and the control unit is configured for extracting power from the movable element during movement of this element in only one direction.

In an embodiment, the at least three ports of the power split transmission comprise at least one input port, at least one output port and at least two control ports, and the control unit is configured for controlling the variable speed auxiliary electrical machine for extracting power from the movable element during movement of this element in a substantially upward direction and also during movement of this element in a substantially downward direction.

In an embodiment, the first mechanical port of the power split transmission is mechanically connected to the input branch of the device; and the second mechanical port of the power split transmission is mechanically connected to the secondary branch of the device, and the secondary branch is mechanically connected to the main electric generator; and the third port is a mechanical control port; and the device furthermore comprises a third branch that mechanically connects the third mechanical port of the power split transmission to the variable speed auxiliary electrical machine.

The power split transmission may comprise a first shaft and a second shaft and a third shaft, the first shaft being connected to the input branch of the device or forming the input branch of the device, the second shaft being connected to the secondary branch of the device or forming the second branch of the device, the third shaft being connected to the third branch of the device or forming the third branch of the device.

In this embodiment, the power split transmission has at least three mechanical ports. The control port is a mechanical port.

It is an advantage of this embodiment that it can easily be constructed using well known components, and that its working is conceptually easy to understand.

In an embodiment, said control unit is configured for controlling an auxiliary torque or an auxiliary acceleration or an auxiliary speed of the auxiliary electrical machine for controlling power distribution to and from any of the at least three ports of the power split transmission.

Devices according to this embodiment have three mechanical branches connected to the three mechanical ports of the power split transmission. The power injected or extracted from each port via each mechanical branch can for example be expressed in terms of torque and angular speed. The law of conservation of energy imposes one relation on these parameters. There are two degrees of freedom. If the torque of two branches is controlled, then all other parameters are determined. If the angular speed of two branches is controlled (directly or indirectly via the control port), then all other parameters are determined. If one torque and one angular speed is controlled (directly or indirectly via the control port), then all other parameters are determined.

In a particular embodiment, the torque and the angular speed of the third shaft connected to the mechanical control port are imposed by the auxiliary electrical machine.

In an embodiment, the device comprises an electrical variable transmission comprising said power split transmission and said main electric generator and said variable speed auxiliary electrical machine; the electrical variable transmission having an inner rotor and an outer rotor and a stator arranged concentrically and being electromagnetically coupled, this electromagnetic coupling realising the main electric generator and said variable speed auxiliary electrical machine; and wherein the inner rotor is mechanically connected to the input branch of the device and the outer rotor is mechanically connected to the secondary branch of the device, or vice versa; and wherein the control port of the electrical variable transmission is an electrical port, and wherein the control unit is electrically connected to the variable speed auxiliary electrical machine comprised in the electrical variable transmission for controlling the power distribution in said electrical variable transmission.

The power in the EVT may be distributed in the form of mechanical power related to the rotation of the inner rotor, mechanical power related to the rotation of the outer rotor and electrical power injected or extracted at the control port, realising the power split.

In an embodiment, the inner rotor is connected to the input branch and the outer rotor is connected to the secondary branch. In another embodiment the inner rotor is connected to the secondary branch and the outer rotor is connected to the input branch.

The "main electrical generator" is not a discrete component or separate entity, but is embedded in the electrical variable transmission, as an integrated part thereof. The function of the "main electrical generator" is mainly defined by the outer rotor and the stator, which can be understood as follows. For example, if the outer rotor comprises a plurality of permanent magnets, and the stator comprises a plurality of coils, then movement of the outer rotor relative to the stator will induce electrical energy in the stator coils in much the same way as a classical electrical generator.

The reason why the term "mainly defined" is used, is because in contrast to a classical electrical generator, an EVT additionally has an inner rotor, which can move relative to the outer rotor and also relative to the stator, and because of electromagnetic coupling between the inner rotor and the outer rotor and between the inner rotor and the stator, movement of the inner rotor will thus also generate electrical energy. In other words, while it can be understood that electromagnetic energy is exchanged between the inner rotor and the outer rotor and the stator, the "main electrical generator" is not a physical object exclusively formed by the outer rotor and the stator, which is why the term "mainly defined by" is used.

Likewise, the "variable speed auxiliary machine" is not a discrete component or separate entity, but is embedded in the electrical variable transmission, as an integrated part thereof. The function of the "variable speed auxiliary machine" is mainly defined by the inner rotor and the outer rotor.

In such embodiments, the power split transmission has at least two mechanical ports and at least one electrical port. The control port is an electrical port. The electrical port may comprise an electrical connector or electrical wiring which are electrically connected to for example slip rings mounted on the input shaft or on the inner rotor or on the secondary shaft or on the outer rotor.

In an embodiment, the device comprises at least one electrical energizing unit.

The at least one electrical energizing unit may be part of the control unit outside the electrical variable transmission and connected to thereto via the control port. Alternatively or in combination, the at least one electrical energizing unit may be part of the electrical variable transmission.

In an embodiment, the at least one electrical energizing unit comprises at least one electrical invertor unit.

In an embodiment, the device comprises at least two invertor units, for example a first electrical invertor unit for selectively injecting and/or extracting electrical power (Pe1) from the EVT in such a way that the outer rotor which is mounted to the secondary shaft performs a unidirectional rotation relative to the stator. The outer rotor and the stator thus effectively function as an electrical generator, and the electrical power generated by this generator is extracted from the EVT via a second electrical invertor unit.

The device may comprise a third invertor unit, electrically connected to the first and the second invertor unit, for interfacing with an external power grid.

In an embodiment, the device furthermore comprises an electrical battery for temporal storage and retrieval of electrical energy.

The electrical battery allows to further reduce the peak power extracted from/injected in the grid.

According to a second aspect, the present invention relates to a method for generating electric energy from a wave motion using a device comprising an input branch connected to a movable element configured for performing an oscillatory movement under the influence of the wave motion; and a secondary branch connected to a main electric generator; and a power split transmission comprising at least three ports including a first mechanical port connected to the input branch, a second mechanical port connected to the secondary branch, and a third port being a control port; and a variable speed auxiliary electrical machine operatively connected to the control port of the power split transmission; the method comprising the steps of: the movable element imposing an oscillatory movement on the input branch as a result of the wave motion, the oscillatory movement being a periodic movement having a period wherein during alternating moments in time positive and negative speeds are imposed to the input branch; controlling a power distribution in said power split transmission so as to realize a one-way rotation of said main electric generator by controlling said variable speed auxiliary electrical machine.

It is an advantage of embodiments of the present invention that the conversion of the wave energy in electric energy can be realized with a power split transmission without freewheels or anti-reverse mechanisms.

It is an advantage of embodiments of the present invention that a more efficient device and method for generating electric energy from a wave motion can be realized.

It is an advantage of embodiments of the present invention that a device and method for generating electric energy from a wave motion can be provided in which the need for wear-sensitive components can be substantially reduced.

In an embodiment, the first mechanical port of the power split transmission is mechanically connected to the input branch of the device; and the second mechanical port of the power split transmission is mechanically connected to the secondary branch of the device, and the secondary branch is mechanically connected to the main electric generator; and wherein the third port is a mechanical control port; and wherein the device furthermore comprises a third branch mechanically connecting the third mechanical port of the power split transmission to the variable speed auxiliary electrical machine; and the method comprises: mechanically controlling said power distribution by controlling the mechanical control port using said variable speed auxiliary electrical machine for mechanically distributing power in the power split transmission.

In an embodiment, the device comprises an electrical variable transmission comprising said power split transmission and said main electric generator and said variable speed auxiliary electrical machine; the electrical variable transmission having an inner rotor and an outer rotor and a stator arranged concentrically and being electromagnetically coupled; and wherein the inner rotor is mechanically connected to the input branch of the device and the outer rotor is mechanically connected to the secondary branch of the device, or vice versa; and wherein the control port of the electrical variable transmission is an electrical port, and wherein the control unit is electrically connected to the variable speed auxiliary electrical machine for controlling power distribution in said electrical variable transmission, and the method comprises: electrically controlling said power distribution by controlling the electrical control port using said variable speed auxiliary electrical machine for electromagnetically distributing power in the power split transmission.

In a third aspect, the present invention also relates to a system comprising a device and a movable element according to the first aspect, wherein the movable element is connected to the input branch of the device, and optionally further comprising a gearbox operatively connected between the movable element and the input branch.

In an embodiment, the system further comprises a gearbox operatively connected between the movable element and the input branch.

It is an advantage of embodiments of the present invention that the conversion of the wave energy in electric energy can be realized with a power split transmission without freewheels or anti-reverse mechanisms.

It is an advantage of embodiments of the present invention that a more efficient device and method for generating electric energy from a wave motion can be realized.

It is an advantage of embodiments of the present invention that a device and method for generating electric energy from a wave motion can be provided in which the need for wear-sensitive components can be substantially reduced.

Particular and preferred aspects of the invention are set out in the accompanying independent and dependent claims.

Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter. The drawings are only schematic and are non-limiting. In the drawings, the size of some of the elements may be exaggerated and not drawn on scale for illustrative purposes.

BRIEF DESCRIPTION OF THE DRAWINGS

FIG. 1 shows a conceptual diagram of a wave energy converter of the point absorber type resulting in an oscillatory movement that can be transformed by embodiments of the present invention.

FIG. 2a and FIG. 2b show second conceptual diagrams of a wave energy converter of the point absorber type resulting in an oscillatory movement that can be transformed by embodiments of the present invention.

FIG. 5a and FIG. 5b show respectively a fifth and sixth conceptual diagram of a wave energy converter of the point absorber type, resulting in an oscillatory movement that can be transformed by embodiments of the present invention.

FIG. 6a and FIG. 6b show two exemplary embodiments of a device according to the present invention, the device comprising a planetary gear box.

FIG. 18 is a conceptual representation of an EVT.

Figure 16:
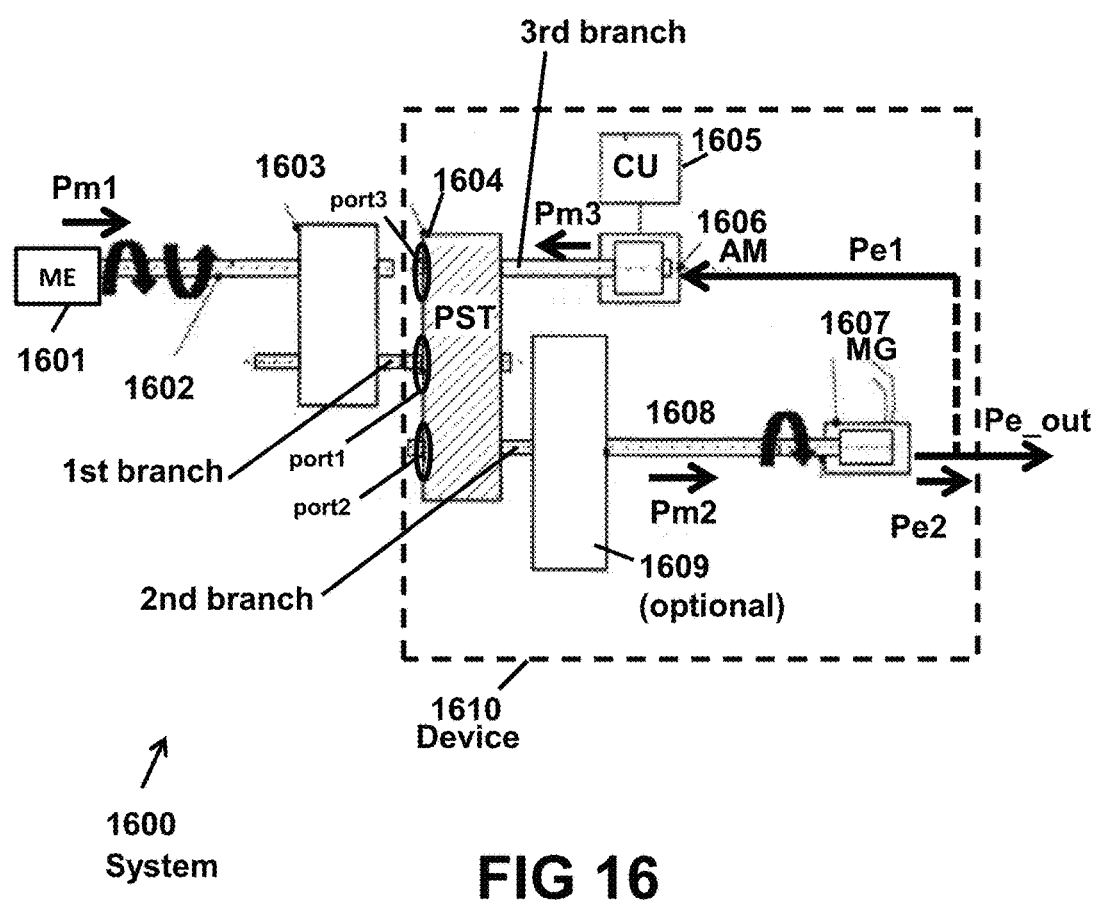
FIG. 16 shows the device of FIG. 11 in a slightly different way as part of a system also comprising the movable element.
Figure 20:
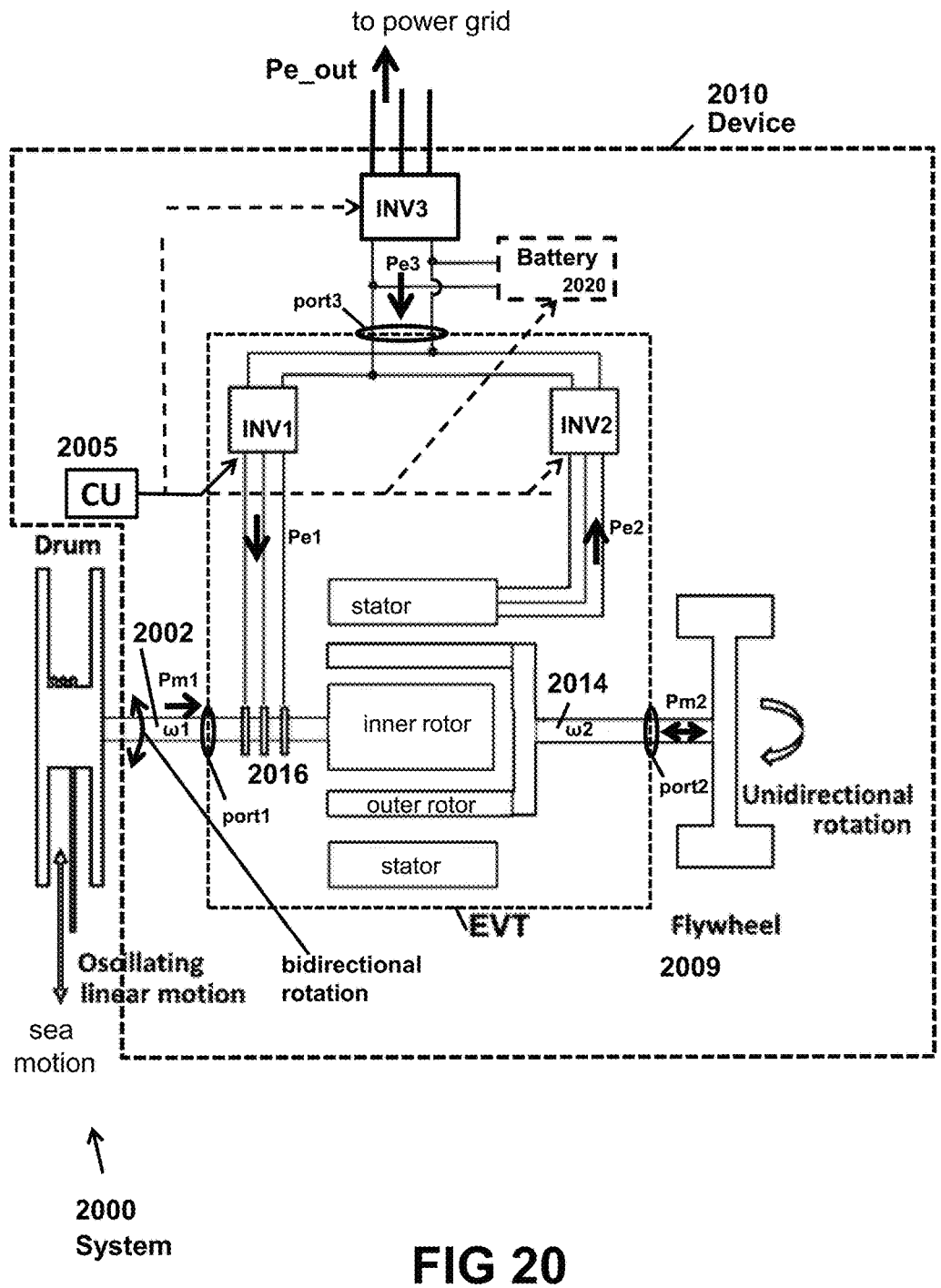
FIG. 20 shows a device for generating electric energy from a wave motion according to an embodiment of the present invention, comprising an EVT.

For completeness it is noted that the arrows in FIG. 16 and FIG. 20 are chosen for illustrative purposes only, and for ease of description, and have no absolute meaning of the direction in which power is actually flowing.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

It is to be noticed that the term "a first element connected to a second element", should be interpreted as the first element being directly connected to the second element or the first element being indirectly connected to the second element, the latter meaning that additional components can be part of this connection.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Where in the present invention reference is made to "input branch", what is meant is a rotatable input means such as for example an "input shaft" or "input cage".

Where in the present invention reference is made to "output branch", what is meant is a rotatable output means such as for example an "output shaft" or "output cage".

Where in the present invention reference is made to "Power Split Transmission" or "Power Sharing Transmission", abbreviated herein as "PST", what is meant is an electromechanical device having at least three ports, and being configured for exchanging power between the at least three ports. At least two of the ports are mechanical ports. The third port can be a mechanical or an electrical port.

Where in the present description reference is made to the "main generator", what is meant is a stand-alone electrical machine or part(s) of an integrated electrical machine that converts the mean (average) power extracted from the waves into electrical energy. The stand-alone main generator may be connected to an output branch of a drive train. The integrated electrical machine may be connected to a secondary branch or shaft which can be an internal shaft or an output shaft.

Where in the present invention reference is made to an "variable speed electrical machine connected to a power split transmission", what is meant is a unit or module or device capable of injecting and/or extracting mechanical or electrical power into and/or from the power split transmission during one period of the oscillatory movement due to a varying speed. During each period, the auxiliary power exchanger may thus act both as a generator (during a portion of the period) and as a motor (during another portion of the period) so as to control the power flow on the control port of the power split transmission it is connected to.

Where in the present invention reference is made to a speed or torque of the main electric generator as being "substantially constant", reference is made explicitly to the variation in speed or torque over one period of the oscillatory movement of the movable element during regime, this variation being below 25%, preferably below 15% of a predefined value, e.g. the rated speed or torque of the main electric generator. It should be noted that this does not mean that over several periods of the oscillatory movement the speed—in fact mainly the torque—may change to a larger extend. These changes in torque or speed over several periods of the oscillatory movement are coupled to the main power delivered to the main generator as extracted by the movable element which depends on the sea state conditions.

Where in the present invention reference is made to "a port of the power split transmission", what is meant is an interface, e.g. a mechanical or electrical interface via which or through which interface the power split transmission can exchange energy or power with the world outside the power split transmission.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. The invention will be further described for point absorber devices, but can in principle be used for any type of wave energy converter considered suitable by the person skilled in the art. FIGS. 1, 2, 3, 4 and 5 all show conceptual diagrams of point absorber wave energy converters, in such converters energy is extracted from the waves by allowing a movable element to move in relation to a fixed reference point.

The device for generating electric energy from a wave motion according to an embodiment of the present invention comprises an element movable under the influence of the wave motion. The movable element of the device may comprise a floating structure, such as for instance a buoy, floater or pontoon, which is moving as a result of the wave motion.

The device further comprises a main electric generator. The main electric generator may be a discrete or stand-alone generator device, or may be formed by one or more parts of an integrated device.

The device further comprises a power split transmission.

The movable element is connected to the input branch of the device and imposes an oscillatory movement on the input branch of the device as a result of the wave motion, for example for providing mechanical power to the device, more in particular for providing mechanical power to the power split transmission.

The main electric generator is typically with one end connected to an electrical power grid, for example indirectly using an invertor.

The main electric generator may optionally also be connected to one or more electrical storage components such as for example one or more electrical batteries or ultracapacitors, for example indirectly using an invertor.

The movable element and the oscillatory movement may be realised in any manner considered suitable by the person skilled in the art. Some examples are given below, without the invention being limited thereto.

Referring now to the Figures.

In FIG. 1 the movable element is a buoy. The buoy shown in FIG. 1 is fully closed, with the exception of at least one hole. The at least one hole allows the exit of a main cable. One end of the main cable is attached to an external reference point, for instance an anchor on the bottom of the sea as shown in FIG. 1. As shown in FIG. 1, the main cable may be guided towards the hole of the buoy through a guiding rod to reduce friction, heating of the main cable and hence extending the life time of the overall device. Inside the buoy, the main cable may then be connected to a drum onto which the cable is winded up and off following the buoy movement. The translation movement of the buoy is as such translated into an oscillatory rotational movement of the drum to which the movable element is connected.

In the devices shown in FIG. 2a and FIG. 2b the oscillatory movement is realised in the following way. In FIG. 2a and FIG. 2b, the movable element is once more a buoy, moving up and down with respect to a spar. This spar can be a mono-pile that has been piled into the seabed or it can be a floating structure with an appropriate shape and weight to create a spar that remains at a merely fixed position. Inside the buoy a pinion gear rotates due to the vertical movement of the buoy in relation to a rack on the spar. The movement of this pinion gear will be a oscillatory movement.

Figure 3:
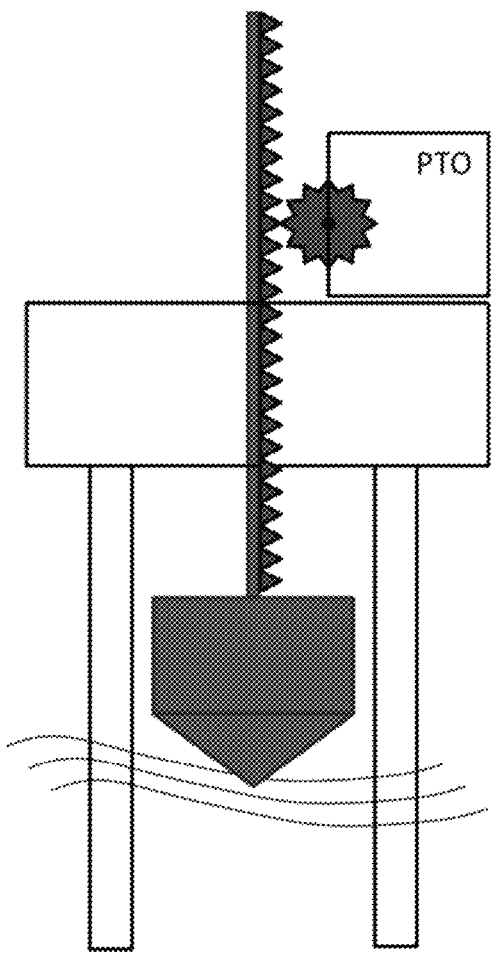
FIG. 3 shows a third conceptual diagram of a wave energy converter of the point absorber type resulting in an oscillatory movement that can be transformed by embodiments of the present invention.

In the device shown in FIG. 3 the oscillatory movement is realised in the following way. In FIG. 3 a fixed platform is created to realise a fixed point of reference. The movable element is once more a buoy with a rack extension. The waves cause the buoy to move up and down resulting in a rotation of the pinion gear located on the fixed platform, the movement of this pinion gear will be an oscillatory movement.

Figure 4:
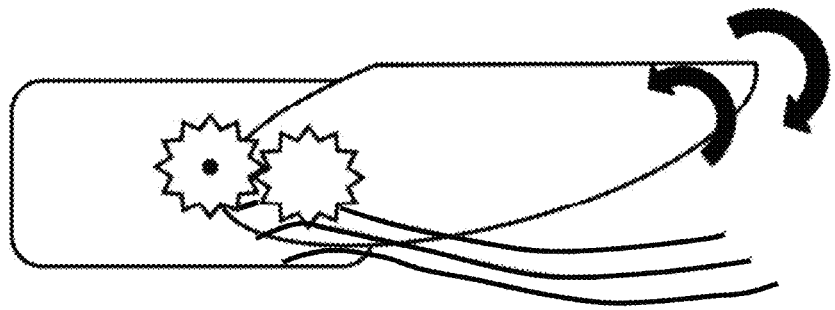
FIG. 4 shows a fourth conceptual diagram of a wave energy converter of the point absorber type, known as the Salter Duck, resulting in an oscillatory movement that can be transformed by embodiments of the present invention.

In the device shown in FIG. 4 the oscillatory movement is realised in the following way. FIG. 4 shows a near-shore device whereby a dike is the fixed reference point. The movable element is a buoy that is able to rotate along an axis. The rotation of the buoy is transferred via an appropriate gear to a rotation of a gear on the dike. The movement of this latter gear will be a oscillatory movement.

In the devices shown in FIG. 5a and FIG. 5b the oscillatory movement is realised in the following way. The devices comprise a floater which is pitching due to the wave motions. Inside the floater an internal mass with an appropriate inertia causes a relative movement between this internal mass and the floater. In FIG. 5a the centre of mass of the internal mass coincides with the centre of rotation, while in FIG. 5b the centre of mass of the internal mass does not coincide thereby creating a pendulum.

Power Split Transmission

As described above, the device for generating electric energy from a wave motion according to embodiments of the present invention comprises a power split transmission, abbreviated herein as "PST".

The power split transmission comprises at least three ports. The at least three ports may comprise at least two mechanical ports, for example a first mechanical port connected to a first rotatable element (e.g. an input shaft) and a second mechanical port connected to a second rotatable element (e.g. an output shaft or an internal shaft), and a third port which may be a mechanical control port (e.g. a third shaft connected to an auxiliary electrical motor) or may be an electrical control port (e.g. an electrical or electromagnetic connection between a rotor and an invertor via slip rings and/or an electrical connection to the coils of a stator).

According to an underlying principle of the present invention, the device further comprises a control unit for controlling the power split transmission in such a way as to cause a unidirectional rotation of the secondary branch (e.g. the output shaft or the internal shaft), despite the fact that the input branch is rotating in a bidirectional manner (e.g. is performing an oscillating movement back and forth).

During operation the "power split transmission" acts as a power splitter in that it exchanges energy or power between the at least three ports. The law of conservation of energy applies. If losses e.g. due to friction are not taken into account, and assuming the power split transmission does not include energy storage devices, the law of conservation of energy states that the sum of the power "provided to" each of the ports of the power split transmission is zero, which can be formulated mathematically as:

$\Sigma(P_i)=0$, for i=1 to N, N being the number of ports.

This formula applies irrespective of whether the power is provided in the form of mechanical power (where Power=Torque×angular speed, written as: $P=T \cdot \omega$)) or in the form of electrical power. The electrical power can for example be provided in the form of a two-phase power (e.g. provided by two electrical conductors), or in the form of a three-phase power (e.g. provided by three electrical conductors).

The device may further comprises energy storage devices, such as for example one or more flywheels capable of temporarily storing/releasing mechanical energy, and/or such as one or more electrical batteries for temporarily storing/releasing electrical energy. If energy storage devices are considered part of the PST, an increase or decrease of the energy stored therein needs to be taken into account in the law of conservation of energy in manners known per se in the art. But typically the energy storage devices are not considered part of the PST.

Two specific embodiments of a suitable power split transmission will be described in more detail:

1) Embodiments where the power split transmission has the form of a mechanical power split transmission (abbreviated herein as "PST"). These embodiments will be described and illustrated further in FIG. 6 to FIG. 15. Such a power split transmission may comprise a planetary gear.

2) Embodiments where the power split transmission is comprised in, e.g. integrated in or embedded in a so called Electric Variable Transmission (abbreviated herein as "EVT"), for example identical to or similar to the type described by [Hoeijmakers]. These embodiments will be described and illustrated further in FIG. 16 to FIG. 20. It is noted that an EVT typically also includes the main electric generator and the variable speed auxiliary electrical machine, albeit not as discrete components.

Figure 11:
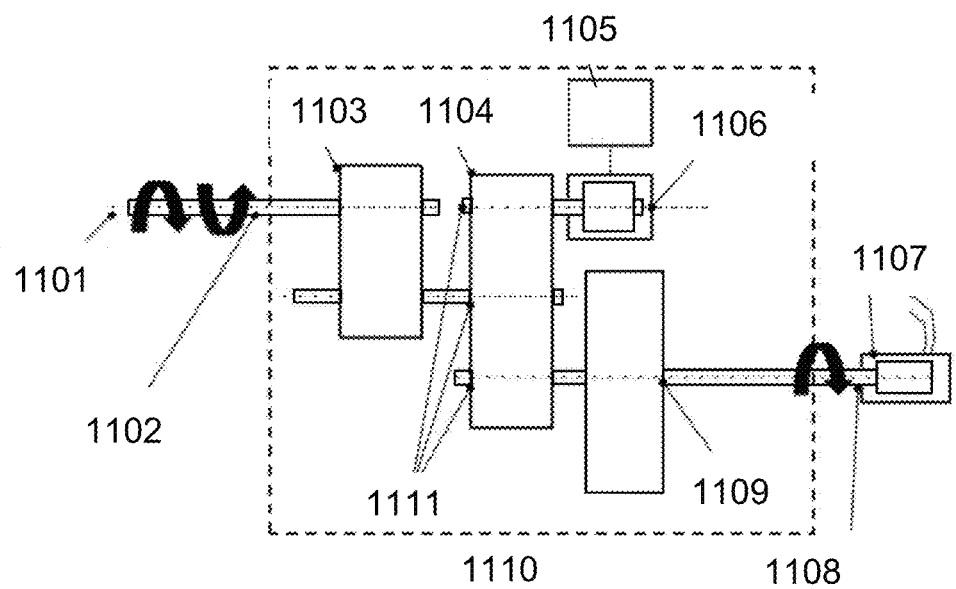
FIG. 11 shows a device according to an embodiment of the present invention comprising a power split transmission, whereby in this case a planetary gear box is used of which the ring gear is connected to an auxiliary generator, the sun gear is connected to a movable element and the planetary gear is connected to a main generator.

Mechanical PST:

A possible implementation of the power split transmission according to embodiments of the present invention is in the form of a mechanical drive train as shown in FIG. 11. FIG. 11 shows the input branch of a drive train being operably connected to the movable element and the output branch of the drive train being operably connected to the main generator. FIG. 11 further shows a drive train comprising a power sharing transmission with three ports.

According to embodiments of the present invention, the movable element imposes an oscillatory movement on the input branch of the drive train as a result of the wave motion. The oscillatory movement thereby typically is a periodic movement having a period wherein during alternating moments in time of the period a positive and negative speed is imposed to the input branch, e.g. to a rotatable axis of the input branch. Due to the nature of wave energy the period of this periodic movement will vary over time, depending on the local wave climate and the existing wave state conditions. Typical periods are in the order of 1 to 10 up to even 15 seconds. The moment in time of positive and negative speeds are hence in the order of 0.5 s to 5 up to even 7.5 seconds.

Figure 7:
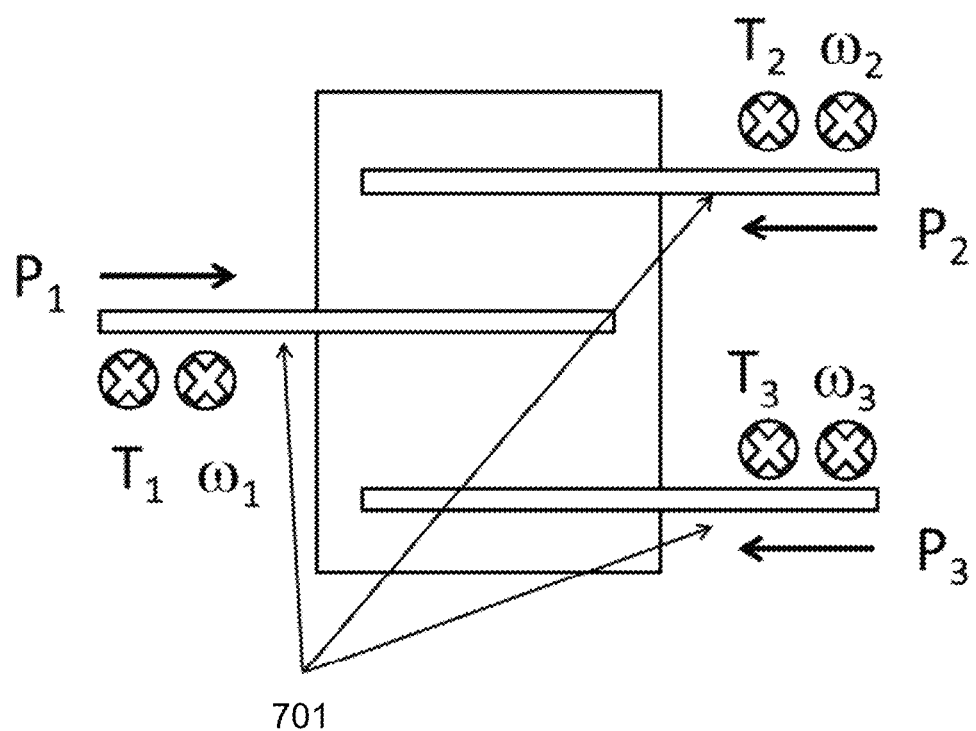
FIG. 7 shows an exemplary embodiment of a device according to the present invention, the device comprising a power split transmission comprising at least three ports, the positive direction of the power flows at each of the ports, as well as the positive direction of the torque and angular speed at each of the ports (using the general engineering notation) being shown.

The drive train of the device according to an embodiment of the present invention further comprises a power sharing transmission or power split transmission. Where in the present invention reference is made to a power sharing transmission or power split transmission, it is meant a device that has N input/output ports (N being at least three) whereby the sum of the power flows ($P_i$) on each of these ports equals zero, or:

$$\sum_{i=1}^{N} P_i = 0$$

whereby each of the power flows $P_i$ is directed towards the device as for instance shown in FIG. 7 showing the reference directions of torque and angular speed. In this equation internal friction and inertia of the power sharing transmission are not yet included (see below).

It should be noted that each of the three ports of the power split transmission can be considered as an input or output depending on the application, the specific moment in time, .... During operation a port may for instance operate as an input port in the sense that it injects power into the power split transmission, while moments later that same port can extract power from the power sharing transmission at which moment in time it could be perceived as an output port.

In drive trains comprising a power split transmission according to the present invention, i.e. drive trains that are used to convert wave energy, the port of the power split transmission connected to the input branch would typically be perceived as an input port, the port of the power split transmission connected to the main generator would typically be perceived as an output port. The at least third port of the power split transmission could be perceived as a control port(s).

The drive train according to the present invention further comprises at least one auxiliary electrical machine connected to the at least one control port of the power split transmission. The auxiliary electrical machine typically may be a variable speed auxiliary machine. The power split transmission in the drive train of the present invention is arranged for distributing power on the input port to the at least one output port and the at least one control port. The distribution of power may be done in such a way that the oscillatory movement imposed on the input branch of the drive train caused by the wave movement is converted in a one-way rotation of a rotor of the main electrical generator connected to the output branch. This may be realized by suitably controlling the power flow on the control port of the power split transmission with the aid of the auxiliary electrical machine and a control unit for controlling the auxiliary electrical generator as will be explained further.

The power sharing transmission or power split transmission may comprise a planetary gearbox, wherein the number of ports is 3, such as shown in FIG. 6a and FIG. 6b. Such a gearbox typically comprises a sun gear, a ring gear and planet gears, which are also sometimes referred to as sun wheel (S), ring wheel (R) and planet wheel (P). In the embodiment shown in FIG. 6b, the sun gear (S) is connected to the movable element (ME) showing the wave-induced oscillatory movement. The ring gear (R) is connected to an auxiliary electrical machine (AM) and the planet gear (P) is connected to the main electrical generator (MG). In the embodiment shown in FIG. 6a, the sun gear (S) is connected to the movable element (ME), the planet gear (P) is connected to an auxiliary electrical machine (AM) and the ring gear (R) is connected to the main electrical generator (MG).

Figure 6C:
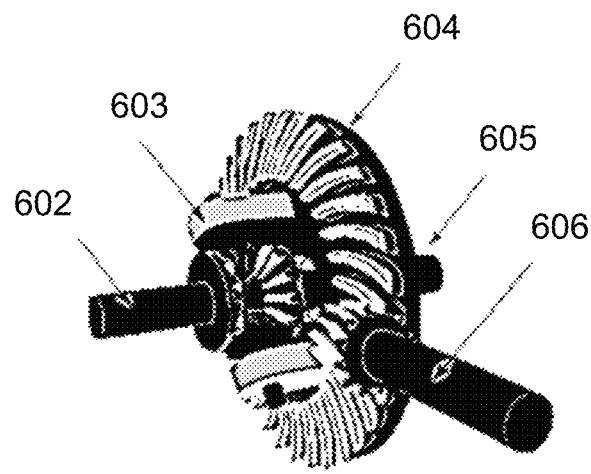
FIG. 6c shows an example of a power split transmission comprising a differential.

The power sharing transmission or power split transmission may comprise a differential, wherein the number of ports is 3, such as shown in FIG. 6c. Such a gearbox typically comprises a pinion gear, a ring gear which is coupled via a differential to a left and right axle. Through such a system the power is split over the two axles. The movable element in such a system could be connected preferably to the pinion gear, the auxiliary electrical machine to either the right or left axle and the main electrical generator to the other axle.

The power sharing transmission can also comprise a combination of one or more coupled planetary gearboxes or differentials as to generate a system with more than 3 ports; e.g. a combination of two differentials.

Figure 8:
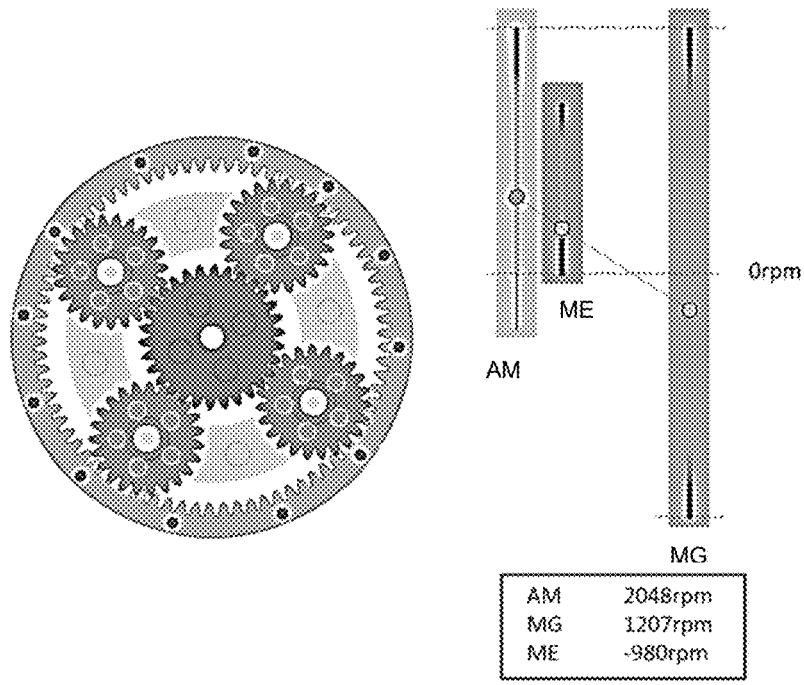
FIG. 8 shows the speed conditions of a device according to an embodiment of the present invention at each of the ports in case the drum speed is negative.
Figure 9:
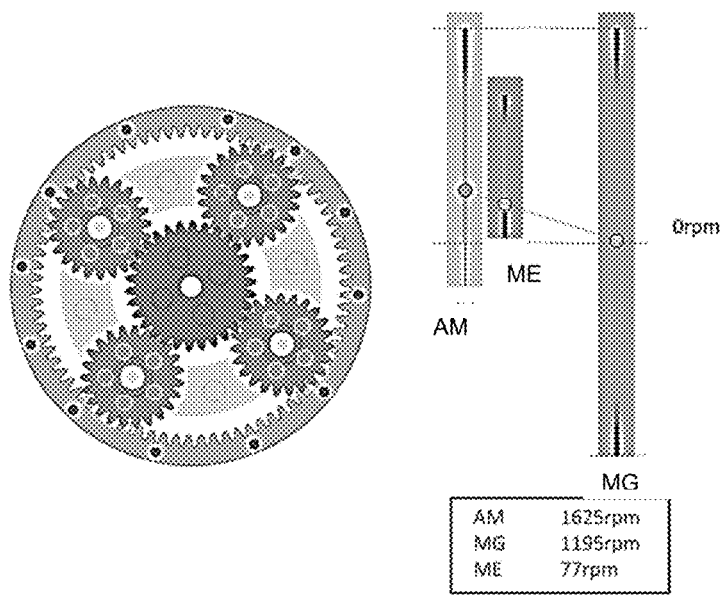
FIG. 9 shows the speed conditions of a device according to an embodiment of the present invention at each of the ports in case the drum speed is close to zero.
Figure 10:
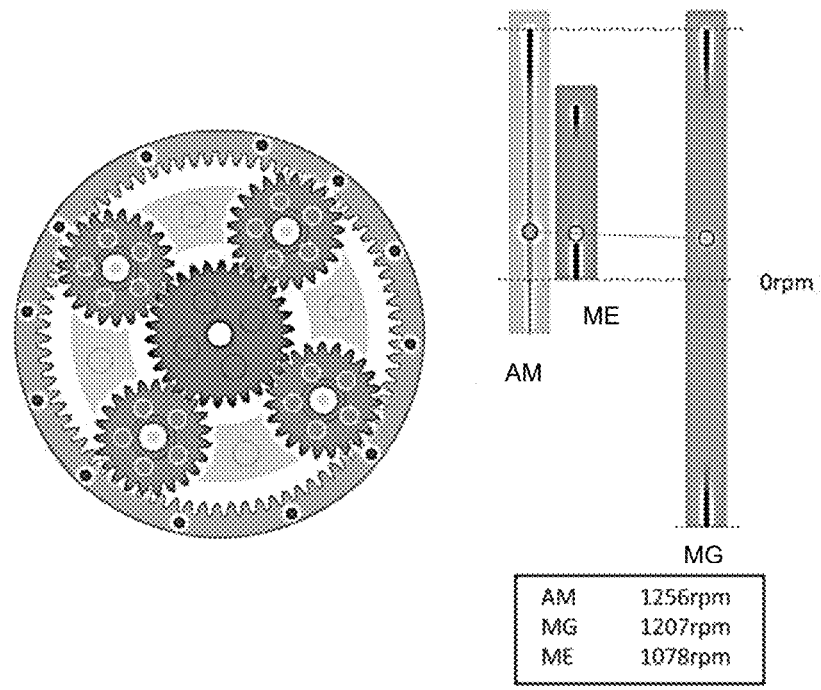
FIG. 10 shows the speed conditions of a device according to an embodiment of the present invention at each of the ports in case the drum speed is positive.

FIGS. 8, 9 and 10 show an example of the rotation speeds of the movable element, a rotor of the auxiliary electrical machine and a rotor of the main generator for a device according to an embodiment of the present invention as shown in FIG. 6a, during several stages of the oscillatory movement. As can be seen, the device according to the present invention may result in a one-way rotation of the rotor of the main generator.

FIG. 8 shows the situation wherein the speed of the movable element is negative, i.e. moving as to cause a rotation in a first direction (negative, counter clockwise), while the other two shafts are running in another direction (positive, clockwise). The rotation speed of the main generator is in this case e.g. approximately 1200 rpm, the speed of the auxiliary machine is about 2000 rpm and the speed of the movable element is about −1000 rpm. It is noted that rpm stands for rotations per minute. This can be converted to angular velocity ($\omega$) using the following formula, 1 rpm=$2\pi$/60 rad/s.

FIG. 9 shows the situation wherein the speed of the movable element is decreased and reaches 0 rpm, the speed of the main generator remains approximately 1200 rpm, while the speed of the auxiliary machine has reduced as well to about 1600 rpm. After this point the movable element will start to show an increase in speed once more to reach its final maximum positive speed.

FIG. 10 shows the situation wherein the speed of the movable element is positive, i.e. moving as to cause a rotation in a second direction, opposite the first direction. In FIG. 10 the situation at a maximum positive speed is depicted. It shows how in this case the movable element has reached about 1000 rpm in the positive direction, while the auxiliary machine is now running at a speed of about 1200 rpm while the main generator remains working at 1200 rpm.

In reality the movable element will operate at speed ranges much lower than 1000 rpm as the waves only move slowly. Appropriate traditional gearing between the movable element and the power split transmission allows to increase the speed of the oscillatory movement, such a gearbox is shown in FIG. 11 as well. Such a configuration allows the main generator to operate at a speed significantly higher than the speed of the drum, leading to an increase in the conversion efficiency of the main electric generator. Moreover when the speed of the main electric generator is kept considerably constant by design, this speed can match the nominal design speed of the generator, resulting in a further increase of the conversion efficiency. Moreover, when keeping the speed of the main electric generator substantially constant the control algorithms implemented on the power electronics controlling this main generator can be of low complexity, i.e. a simple single quadrant power converter can be applied.

The drive train according to the present invention also comprises a control unit for controlling the auxiliary electrical machine, as is for instance shown in FIG. 11. To understand how the auxiliary electrical machine can be controlled to realise the advantages according to the present invention, we will first explain how the movements of the shafts in the drive train are coupled by referring to FIG. 7. The drive train comprising a power split transmission, on the input branch connected with the movable element and on the output branch connected with the main generator, can be modelled as a kinematic chain of rigid bodies, with two degrees of freedom. The relationship between the shaft speeds ($\omega_1$, $\omega_2$ and $\omega_3$) of each of the three ports, imposed by the power split transmission is:

$$\omega_1 \pm k_2 \cdot \omega_2 + k_3 \cdot \omega_3 = 0 \tag{1}$$

Herein, the angular velocity of the first shaft equals $\omega_1$, in the case of a planetary gear box the gear ratios between the second and first resp. third and first shaft are $k_2$ and $k_3$. The gear ratio may for instance be determined from the number of teeth of each of the teethed gears (e.g. of the sun gear, ring gear and planet gear) in the power split transmission. In FIG. 7, the speed $\omega_1$ is the angular velocity of the shaft connected to the input branch of the drive train. In FIG. 7, the speed $\omega_2$ is the angular velocity of the shaft connected to the control port. In FIG. 7, the speed $\omega_3$ is the angular velocity of the shaft connected to the output branch of the drive train.

Furthermore, the external forces acting on all these bodies can be taken together to act as one single external moment or torque T on each of the corresponding rotating axes ($T_1$, $T_2$ and $T_3$). Equally, the inertia I from separate bodies can be taken together to form one equivalent inertial moment I for each of the corresponding shafts ($I_1$, $I_2$ and $I_3$). E.g. in the present example of FIG. 7, the hydrodynamic force operating on the movable element and the global inertia of the movable element itself can be expressed in a single moment operating on the first shaft of port 1 and a single inertial moment I present on the first shaft. Indeed, typically, the $T_1$, $T_2$ and $T_3$ will contain the contributions of respectively the hydrodynamic forces on the WEC and the torques applied by the auxiliary ($T_2$) and main electrical machine ($T_3$), as these are the only external forces acting onto the kinematic chain.

Supposing again that friction can be neglected, the following two independent equations of virtual power, corresponding to two independent virtual movements $\delta\omega^1$ and $\delta\omega^2$ of each of the three shafts, can be written for this kinematic chain ($\omega_{1\_}dot$ is the time derivative of $\omega_1$, $\omega_{2\_}dot$ is the time derivative of $\omega_2$, $\omega_{3\_}dot$ is the time derivative of $\omega_3$):

$$(T_1 - I_1 \cdot \omega_{1\_}dot) \cdot \delta\omega_1^1 + (T_2 - I_2 \cdot \omega_{2\_}dot) \cdot \delta\omega_2^1 + (T_3 - I_3 \cdot \omega_{3\_}dot) \cdot \delta\omega_3^1 = 0 \tag{2}$$

$$(T_1 - I_1 \cdot \omega_{1\_}dot) \cdot \delta\omega_1^2 + (T_2 - I_2 \cdot \omega_{2\_}dot) \cdot \delta\omega_2^2 + (T_3 - I_3 \cdot \omega_{3\_}dot) \cdot \delta\omega_3^2 = 0 \tag{3}$$

The (independent) virtual motions for each of the three shafts ($\delta\omega^1$ and $\delta\omega^2$) can be deliberately chosen, as long as they fulfil the relationship between the shaft speeds, imposed by the power split transmission:

$$\omega_1 + k_2 \cdot \omega_2 + k_3 \cdot \omega_3 = 0 \text{ hence}$$

$$\delta\omega_1^1 + k_2 \cdot \delta\omega_2^1 + k_3 \cdot \delta\omega_3^1 = 0, \text{ and}$$

$$\delta\omega_1^2 + k_2 \cdot \delta\omega_2^2 + k_3 \cdot \delta\omega_3^2 = 0$$

In general, from the two equations of virtual power (2) and (3), at each moment in time, two variables can be calculated. If all properties of the kinematic chain are known and if the hydrodynamic interaction of the movable element with the wave(s)/fluid is established as functions of draft, velocity and acceleration, the application of a torque $T_2$ and $T_3$—respectively the torque through the main generator and the auxiliary motor/generator and the main generator—allows to calculate the acceleration $\omega_{2\_}dot$ and $\omega_{3\_}dot$. The resulting acceleration $\omega_{1\_}dot$ of the input shaft—and hence of the movable element itself—may also be readily calculated from equation (1). Given the $\omega_{1\_}dot$ and the known hydrodynamic interaction of the movable element with the wave(s)/fluid as a function of draft, velocity and acceleration, the actual torque $T_1$—and hence the external forces acting on the movable element and WEC—may be calculated.

Now with the above tools, an example of a simple control strategy applied to a possible embodiment of the present invention is described hereunder. The example is explained for the simplified case of sinusoidal wave (known) motions in regime. For unknown and irregular waves the motion of the waves may be predicted based on any suitable algorithm, additional sensors, . . . .

In regime, and according to embodiments of the present invention, the main electric generator preferably works close to its nominal speed. Depending on the total inertia on the main electric generator shaft, more or less acceleration/deceleration ($\omega_3\_dot$) will occur during one period of the oscillatory movement. Hence, for a given generator control strategy, the torque $T_3$ is predetermined or $\omega_3\_dot$ is predetermined.

At the same time, for a given sea state, it can be estimated or predicted at each moment in time (with known draft and velocity) given the hydrodynamic characteristics of the movable element, which acceleration and associated torque profile need to be applied on the input branch in order to guarantee maximum wave energy extraction. Hence, the ideal torque $T_1$ to be applied on the input shaft may be known in advance, and it will thus be up to the control unit of the auxiliary electrical machine to apply the needed torque $T_2$ (or acceleration, $\omega_2\_dot$), to guarantee optimal WEC movement and hence wave power extraction. The torque $T_1$ to be applied on the input shaft to extract maximum power from the waves can for instance be determined with methods described in "Modelling of hydraulic performance and wave energy extraction by a point absorber in heave", 28 Sep. 2004, Vantorre et al., which is incorporated herein by reference. The movement of the kinematic chain shall hence result in a one-way rotation of the main generator, preferably in a range close to its nominal speed and preferably being substantially constant. Thereto, at certain intermediate moments of the oscillatory movement during one period of the oscillatory movement, the auxiliary electrical machine may need to inject power into the drive train, while during other periods the auxiliary electrical machine may need to extract power from the drive train. Hence, the auxiliary machine will need to be able to operate both as a generator and a motor. As such the auxiliary machine actively controls over the period of the oscillatory movement the power flow from the movable element to the main generator. Yet, controlling may still result in the combined requirements on the shaft connected to the auxiliary electrical machine (through $T_2$) and the shaft connected to the main generator (through $T_3$). A well thought of design of the drive chain (e.g. by adding a rotational inertia on shaft 3, in order to store excess extracted power and limit momentary speed variation) allows to realise these requirements more easily; i.e. with an auxiliary machine with a lower rated power or a main generator with a simpler control strategy or less speed variations in the speed/torque of the main generator.

FIG. 16 shows the device of FIG. 11 in a slightly different way. In FIG. 16, the discrete PST (or mechanical PST) is indicated by shading. FIG. 16 shows that the discrete main electric generator 1607 generates electric power Pe2. The movable element 1601 provides mechanical power Pm1 to the first port "port1" of the PST which is connected (directly or indirectly, e.g. via a classical gearbox 1603) to the input shaft 1602.

When operating as a motor, the Auxiliary Electric Machine 1606 receives electrical power Pe1 and provides mechanical power Pm3. When operating as a generator, the auxiliary electric machine 1606 receives mechanical power Pm3 and provides electrical power Pe1

In the example of FIG. 16, the electrical power "Pe1" for powering the auxiliary machine 1606 comes from the main generator 1607 (as indicated by the dashed line), but that is not absolutely required, and the power Pe1 could also come from elsewhere, for example from a battery (not shown) and/or from a power grid or from another power source.

As described above, the auxiliary electrical machine 1606 is adapted for providing mechanical power "Pm3" to the control port "port3" in such a way that the speed of the output branch of the PST, which is connected to the second port "port2" of the PST and to the main electrical generator 1607 is rotating in a single direction, i.e. is unidirectional, and preferably also varies only within a predefined speed range (during regime).

FIG. 16 is a block-diagram showing the main components of a system 1600 comprising the device 1610 described above connected to a movable element 1601 via a gearbox 1603. Of course, in practical implementations additional components such as for example a power electronics convertor for driving the auxiliary electric machine would also be present.

Figure 12:
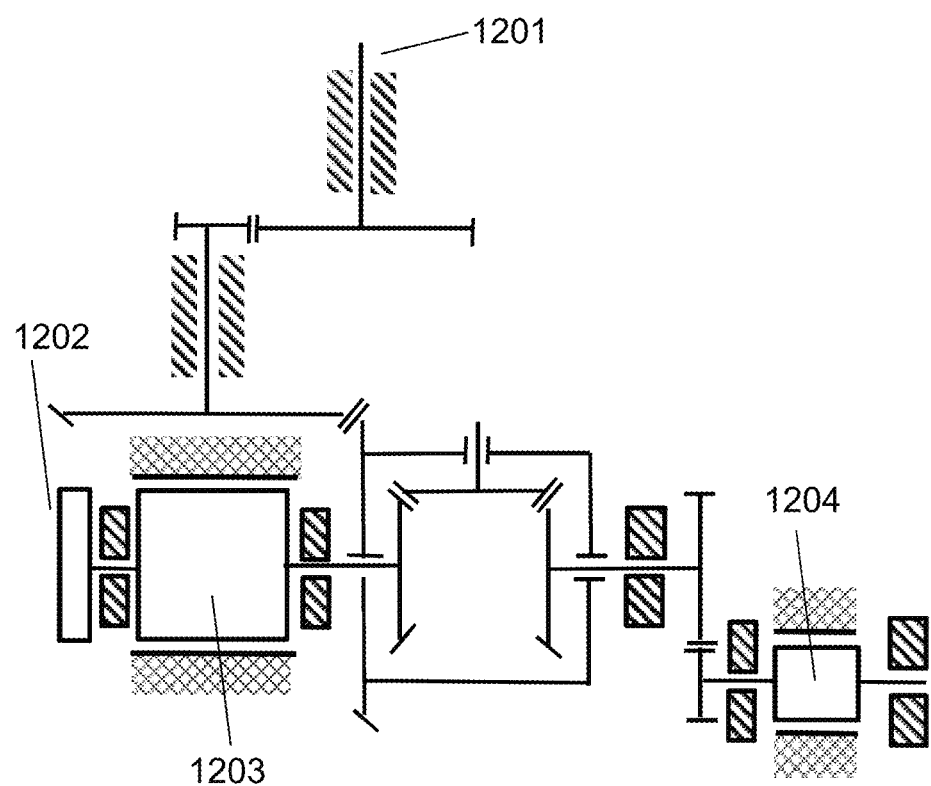
FIG. 12 shows a more detailed implementation of a device according to an embodiment of the present invention comprising a power split transmission, whereby in this case a differential is used.
Figure 13:
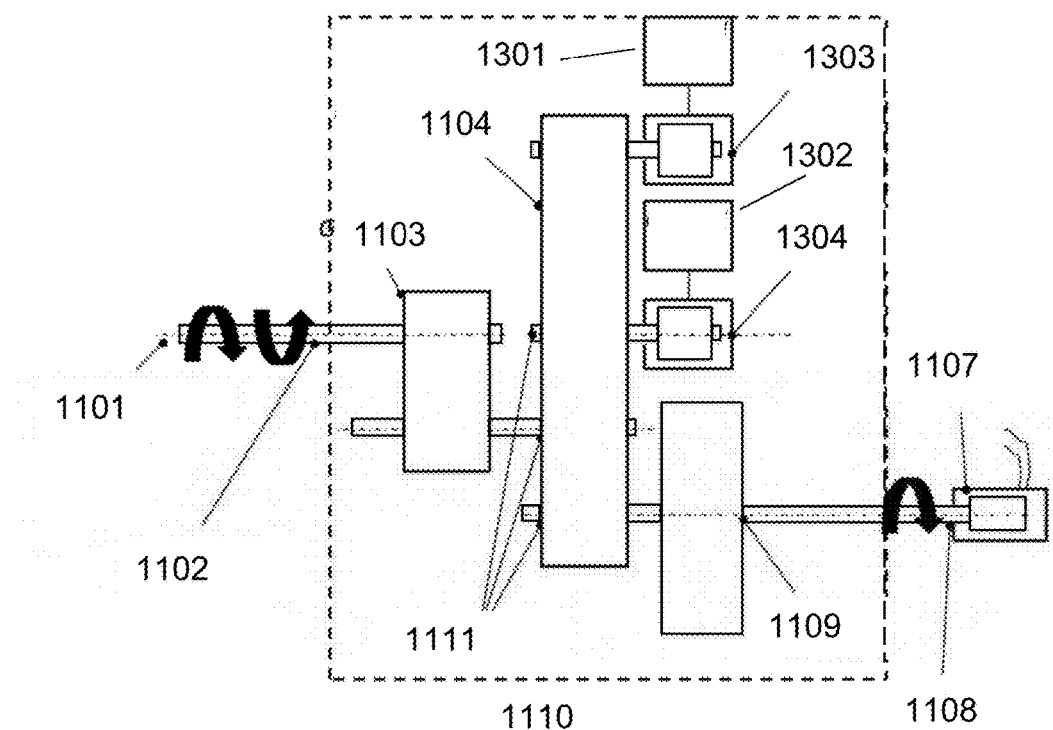
FIG. 13 shows a device according to an embodiment of the present invention comprising a power split transmission with one input port, one output port and two control ports.
Figure 15:
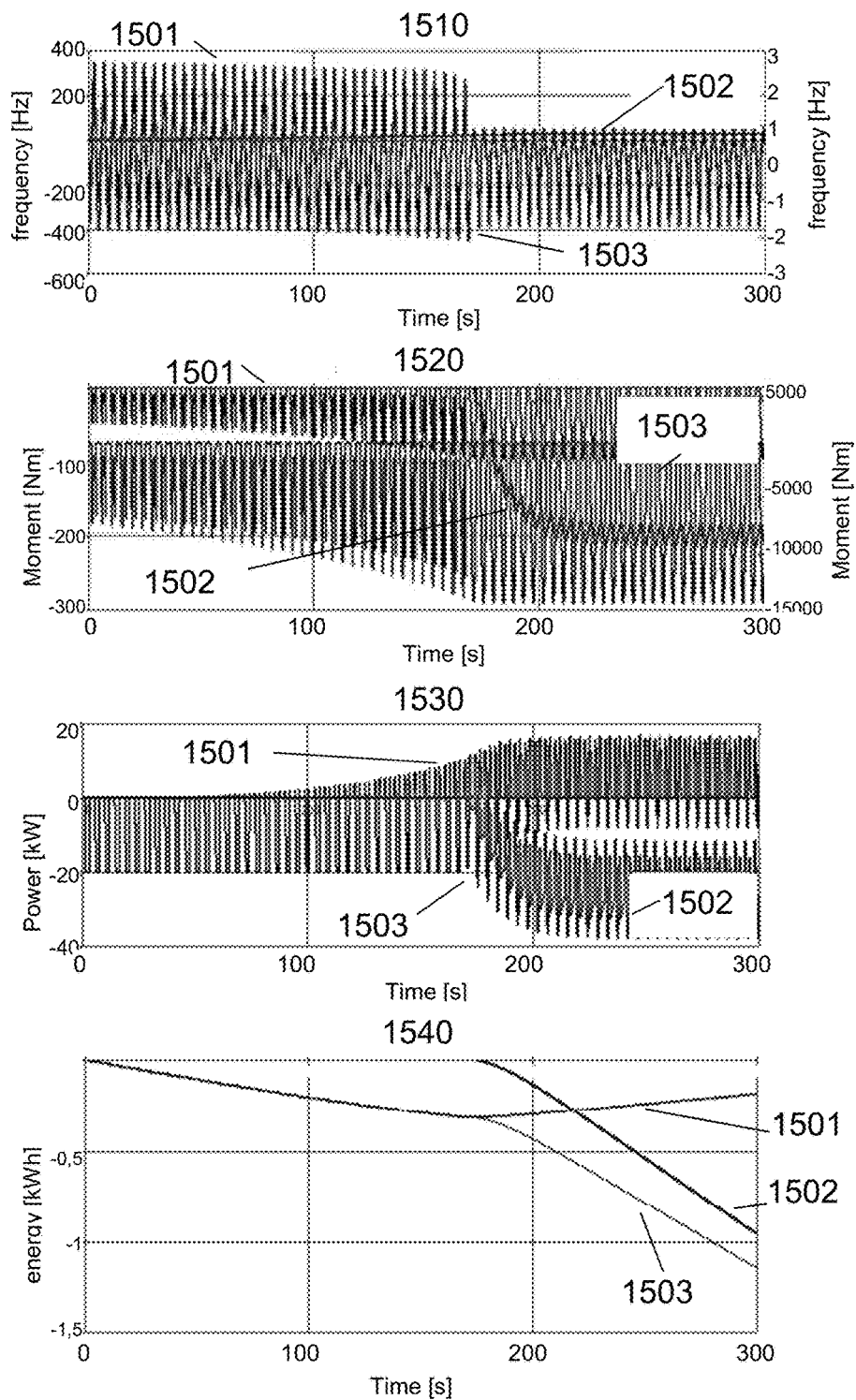
FIG. 15 shows some results of the operation of device 12, more particularly it shows the speed of the axis at the input, control and output port; resp. the torque on each of the axis; resp. the power extracted/injected at the control and output port; resp. the energy used/produced at each of the ports.

Using the system of FIG. 12 a simulation was done for a buoy with a cable connected to the sea bed, the cable connected to a drum (corresponding to the movable element), corresponding to FIG. 1. The buoy consists of a floater of 3 m height, 5 m diameter, a mass of 25 ton and a volume of 60 m³. The incoming waves were assumed to be known and corresponding to a sea-state 3. In line with the above method first the torque required to get the maximum power output from the waves was determined. Due to the cable the transferred torque can only be positive (i.e. pulling the buoy in the water, it cannot be pushed upwards). Due to a fixed ratio of the torques of the input, output and control shafts, the required torque at the moveable element should be controlled by the torque realised at the control port. In short, when the buoy moves downwards the torque is zero, when the buoy moves upwards the required torque is generated by the auxiliary machine (assume this corresponds to a negative torque). At the same time this torque realised at the control port creates a negative torque at the output port. The power which is extracted as such from the moveable element is split to the control port and the output port. When initially, no power is extracted at the generator this power at the output port is used to speed up the flywheel. This is shown in FIG. 15 whereby the speed of the main generator increases. During this first period, no power is extracted, nor delivered by the auxiliary generator during downward movements, during upward movement there is a net power generation by the auxiliary generator. After this first period, power is extracted at the main generator as can be seen by the fact that the torque is settling to a fixed negative value (with some remaining fluctuation). During this period, during the upward movement power is extracted from the movable element to speed up the flywheel and to generate power by the main generator; during the downward movement power is generated by the main generator by extracting some mechanical power stored in the flywheel. The rated power of this main generator can be in the order of 40 kW, and a very low complexity main generator can be used. Furthermore, it can be observed that the power levels at the auxiliary generator are in the order of 20 kW, more importantly it is noticed that the power changes sign meaning the auxiliary machine both works as a generator and as a motor. As the torque is always negative, it means that the speed changes sign, hence a variable speed auxiliary electrical machine is required. The total output power is in the order of 25 kW. It can be shown that the same output power can be realised by a direct connection between the movable element and a main generator and according power electronics which would require a rated power of 100 kW, while now two machines and two power electronics with a lower rated power are required.

Figure 14:
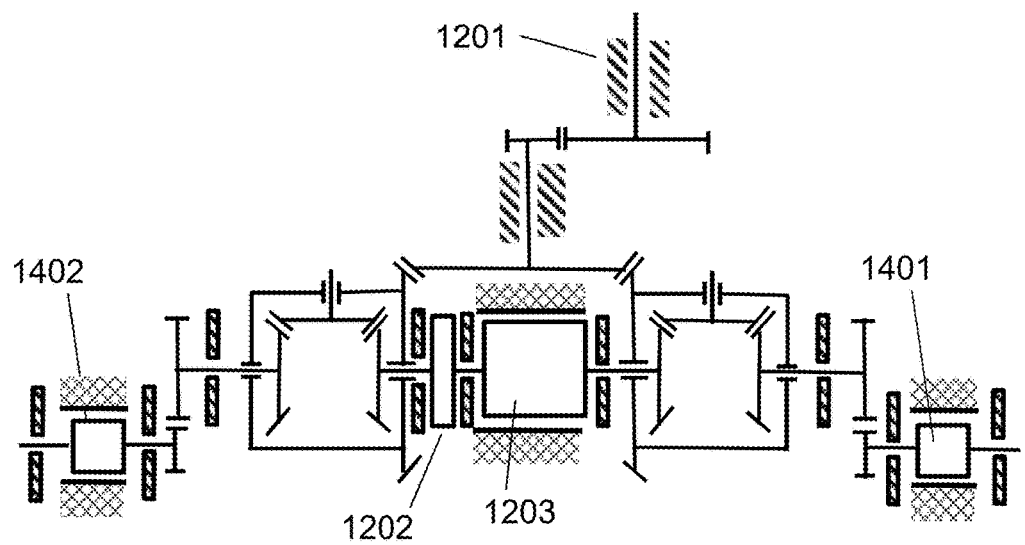
FIG. 14 shows a device according to an embodiment of the present invention comprising a power split transmission with one input port, one output port and two control ports and whereby the power split transmission is implemented by using the combination of two differentials.

Using the system of FIG. 14 a simulation was done for a buoy with a rack and pinion system as e.g. corresponding to the system of FIG. 2, the buoy again consists of a floater of 3 m height, 5 m diameter, a mass of 25 ton and a volume of 60 m$^3$. The incoming waves were assumed to be known and corresponding to a sea-state 3. In line with the above method first the torque required to get the maximum power output from the waves was determined. This time both positive and negative torques can be transferred to the buoy. However, if we would provide a negative torque at the control it would result in a negative torque at the output port as well, which will in regime cause the main generator to change direction all the time. Hence, an additional control port is required. This is realised in the system of FIG. 14, comprising two differentials whereby there is a fixed coupling between the right and left axle of the two differentials, to this coupled axles the main generator and flywheel are connected. This allows not only to impose a negative torque at the level of the movable element while still imposing a positive torque at the main generator. In such a system the two control ports work in an alternating way, whereby negative torque is imposed by control port 1 while positive torque is imposed by control port 2.

With reference to FIG. 12, it might thus be required to operate the auxiliary electrical machine in operating conditions which are much further away from the optimal, in terms of efficiency and operating points. It is however an advantage of the invention that the auxiliary machine can be of lower power compared to the main generator as such losses in this machine are of less importance compared to losses in the main generator. E.g. in an extreme case assume the main generator has a rated power of 100 kW and the auxiliary machine has a rated power of 1 kW, then even a difference in efficiency of the auxiliary machine of 10% vs. 90% only leads to a difference in overall efficiency of about 0.8%. In the example above two cases are compared: (1) transforming on average 25 kW of wave energy with a single machine of 100 kW and (2) transforming 25 kW of wave energy with a main generator of 40 kW and an auxiliary electrical machine of 20 kW. In the first case the 100 kW machine will have a very low average efficiency due to the fact that it will constantly change direction and speed. Assuming e.g. 50% only 12.5 kW of electrical power of the 25 kW will actually be generated. In the second case, for the main generator of 40 kW a highly efficient generator can be selected and due to the uni-directional movement the generator can work in optimal conditions leading to efficiencies of e.g. 90%. Hence, of the 25 kW 22.5 kW of electrical power will be generated. It should still be understood that additional losses will occur in the auxiliary electrical machine of 20 kW leading to a lower net output power. However, at an assumed average load of ¼ of the rated power (same as the main generator in case 1) and an assumed efficiency of 50% (the same assumption as for case 1) this would lead to an additional loss of about 3 kW and a net output power of 19.5 kW. Hence, the overall efficiency of the proposed system (with a net output power of 19.5 kW) will be higher than the conventional one (with a net output power of 12.5 kW).

It should be noted that more advanced control strategies can be implemented, all with the common characteristic of realizing a unidirectional movement of the main generator while further optimizing the behaviour of the wave energy converter. As such special control strategies that take into account measurements of the behaviour of the converter, the wave motions, statistical or stochastical analysis of different parameters, . . . can be implemented to further improve the operation of the converter.

It should be noted that the drive train can further include additional components in order to further improve its design and/or operation. As such the mechanical oscillatory movement of the drum of FIG. 1 connected to the movable element could first be converted into an oscillatory movement of a mechanical shaft by means of a gearbox, belt transmission, or any other type of transmission in order to change the speed and torque of the mechanical shaft connected to the input shaft. This transmission ratio might be variable with discrete steps, whereby the several steps are selected depending on the wave climate the WEC is designed for. The gear ratio is then used to adapt the natural frequency as to fit the wave frequency. The natural frequency of the WEC is defined by the frequency at which the WEC shows a maximum amplitude of movement response when triggered by wave excitations. The natural frequency is determined by many design parameters a.o. the shape and weight of the WEC and the inertia on the mechanical shaft, . . . .

Moreover, the steps in the transmission ratio could be changed during operation to adapt the WEC to the momentary occurring sea state conditions, as such fine tuning the natural frequency of the WEC to the wave frequency. More advanced transmission systems such as a continuous variable transmission can be used to allow for further tuning of the natural frequency of the WEC to the wave frequency. Doing so, the power in the oscillatory movement can be maximized.

The drive train could also include flywheels on any of the three shafts directly or indirectly connected to the input, output and control ports. Such flywheels can be used to change the inertia of the WEC and to ensure the natural frequency is adapted to the wave climate the WEC is designed for. Moreover, one could opt to allow the inertia of the flywheels to be tunable either in a discrete or continuous way. This would further allow to tune the natural frequency of the WEC to the momentary sea state conditions occurring. Doing so, the power in the oscillatory movement can be maximized.

The flywheels, could also be used to damp variations in speed at the main generator. Furthermore, flywheels could be used to mechanically store energy on one of the shafts. The latter is of importance e.g. for the shaft with the main generator. Adequate design of the flywheel(s) allows to reduce the required rated power of the auxiliary generator, as the flywheel can be used to add inertia to the main generator as such limiting its speed variations.

The drive train could also include other means for temporally storing energy, such as short term electrical storage means or hydraulic storage buffers, the storage means assisting the auxiliary generator in adequately controlling the torque and speed on the output shaft to ensure that the torque-speed conditions of the main generator are close the most optimal operating conditions.

The drive train finally could include one or more freewheels, anti-reverse systems or clutches on one of the shafts. Though it is an explicit objective of this invention not to use freewheels, anti-reverse systems or clutches for converting and inverting the oscillatory movement into a unidirectional movement, the use of any of such components might proof to be interesting for realising other desirable functions of the drive train, e.g. a clutch could be used to disengage the drive train from the drum in case of wave storm conditions and to prevent overloading.

It will be understood by those skilled in the art that the same objective for creating a unidirectional movement on an output shaft induced by an oscillatory movement on an input shaft can be realised as well by other configurations: sun gear connected to the shaft with the oscillatory movement, ring gear connected to the main generator and planet gear connected to the auxiliary generator. It is clear that the best design depends on the gear ratios, required speed and torque levels or limits, . . . .

It will be understood that similar oscillatory movements and conditions occur in other types of WECs.

It will be understood by those skilled in the art that, though a simple single quadrant power converter can be applied for the main generator, there might be other reasons for choosing a more advanced four-quadrant power converter. Such reasons might include the need to realize start-stop cycles, to perform frequency or voltage control of the grid connected generator. During start-up behaviour the main generator will act as a motor.

It will be appreciated by those skilled in the art that though the principle of operation was described using a specific type of point absorber, similar oscillatory movements can be obtained using other types of point absorbers or other types of wave energy converters.

Power Split Transmission Comprised in an EVT:

As indicated above, two specific types of Power Split Transmission are envisioned: the discrete or mechanical PST described above, and a PST integrated into an electromagnetic EVT, which will be described next.

Figure 17:
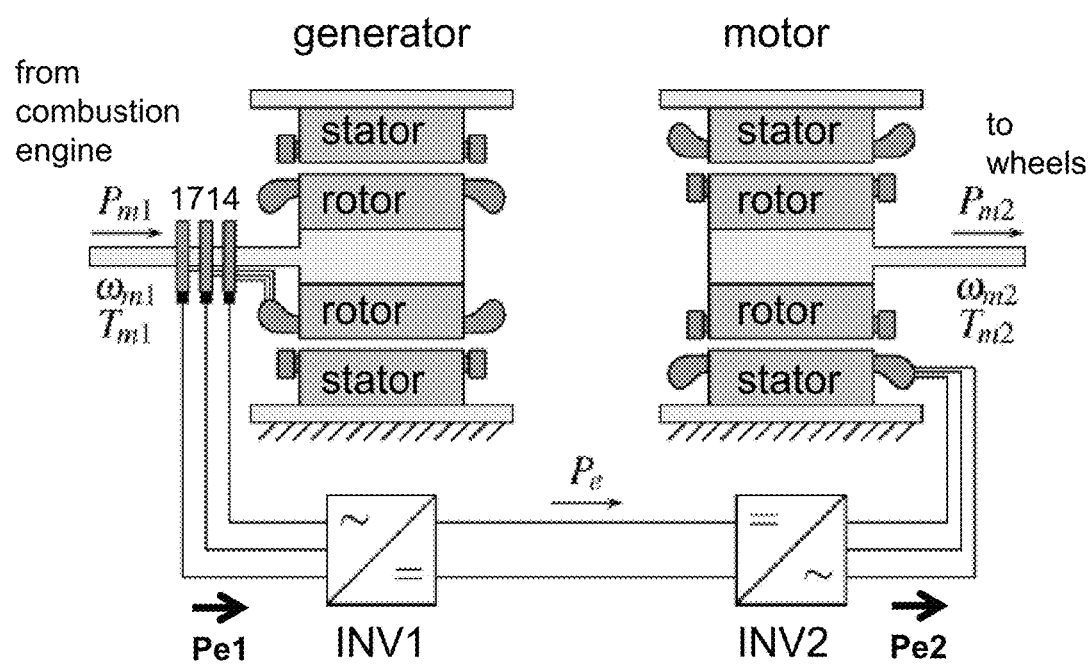
FIG. 17 is a replica of FIG. 2 of [Hoeijmakers], illustrating a cascade system for converting mechanical energy provided by a combustion engine to a first axis rotating at a first angular speed into electrical energy, which electrical energy is converted back into mechanical energy provided to a second axis rotating at a second angular speed for moving the wheels of a vehicle, typically different from the first angular speed.
Figure 18:
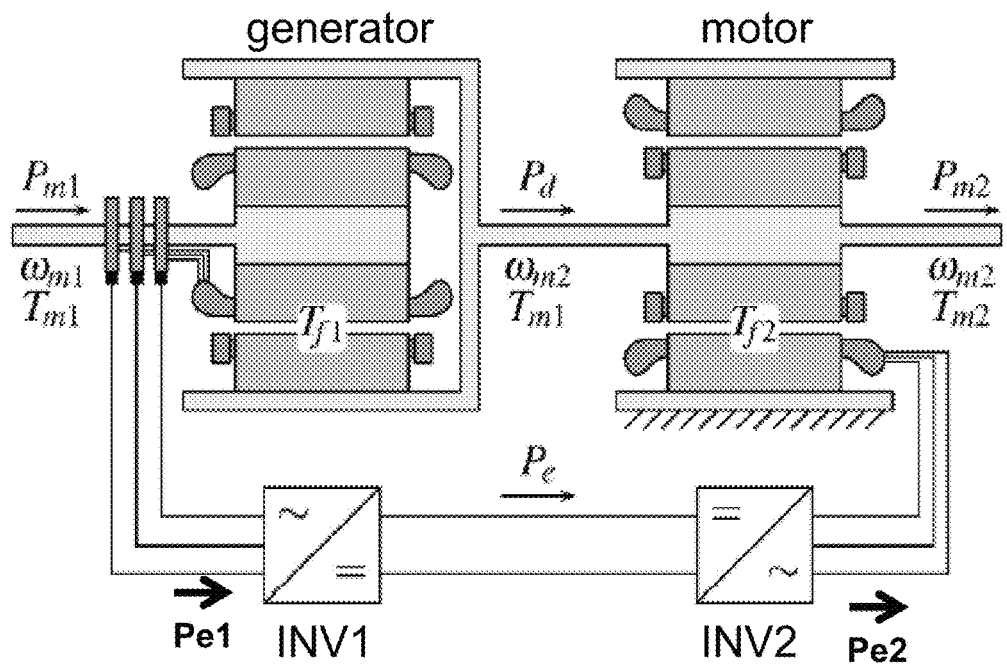
FIG. 18 is a replica of FIG. 3 of [Hoeijmakers], illustrating the basic principles of a so called EVT (Electric Variable Transmission).
Figure 19:
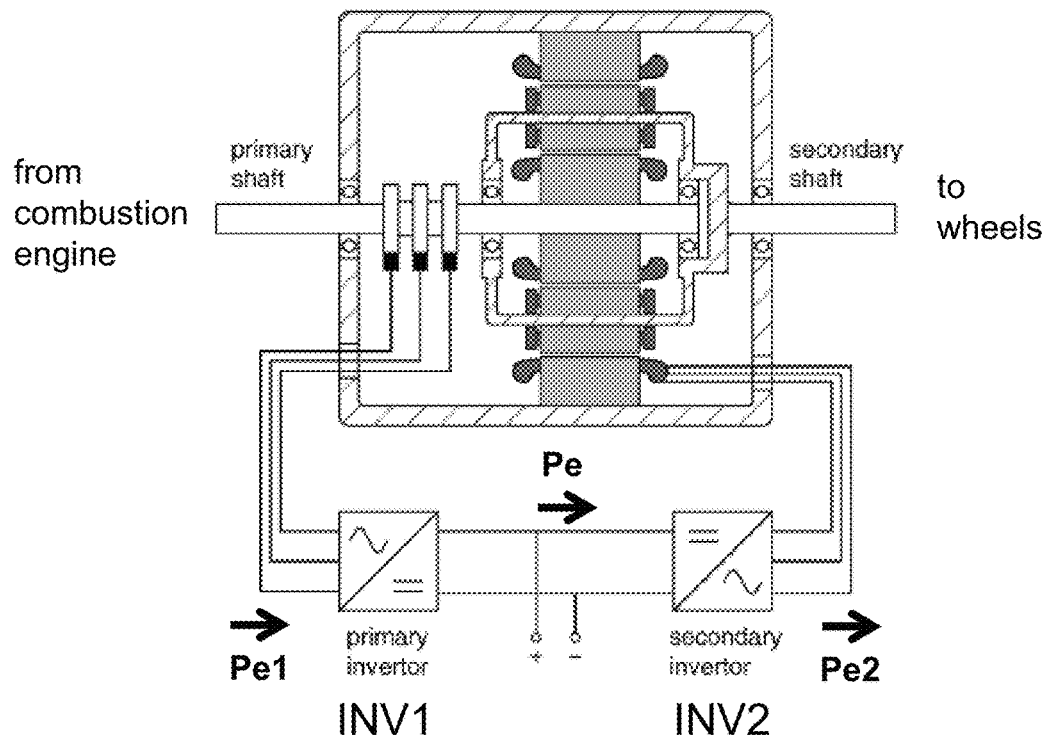
FIG. 19 shows a possible implementation of the EVT comprising an inner rotor and an outer rotor and a stator arranged concentrically, movable relative to each other. It has (inter alia) a primary shaft and a secondary shaft which can rotate at different speeds.

Before describing embodiments of the present invention, the prior art systems of FIG. 17 to FIG. 19 will be briefly discussed, in order to better understand what an EVT is, and how it works.

FIG. 17 is a replica of FIG. 2 of [Hoeijmakers], illustrating a cascade system of two discrete or distinct electromechanical machines, a generator and a motor, mechanically separated from each other. Mechanical power Pm1 (for example originating from a crank of a combustion engine) is provided to an input axis of the generator. The input axis provides a torque T1 and rotates at a first speed $\omega 1$, thus provides a power $P1=T1\times\omega 1$. This mechanical power Pm1 is converted into electrical AC-power Pe1 by the generator. The electrical AC power Pe1 is provided via slip rings 1714, and is subsequently converted into DC-power "Pe" by an AC/DC converter INV1 (also referred to herein as "Rectifier" or "primary invertor"). The DC-power is subsequently converted into AC power Pe2 by a DC/AC convertor INV2, also referred to herein as "second Power Electronics" or secondary invertor", for powering the electrical motor, for example the motor of an electric or hybrid car or bus, which converts the electrical power Pe2 back into mechanical energy Pm2 for rotating the wheels of the vehicle. Although the system of FIG. 17 is able to operate as variable electric transmission, the power efficiency of such a system is not particularly high due to the many energy conversions, as described by [Hoeijmakers].

FIG. 18 is a replica of FIG. 3 of [Hoeijmakers], illustrating "the principles" of a so called EVT as can be used in hybrid vehicles. An important difference between the system of FIG. 17 and the system of FIG. 18 is that in the system of FIG. 17, the "stator" is stationary whereas in the system of FIG. 18, the "stator" of the generator is not stationary, but is connected to the rotor of the motor, and thus is rotatable. The effect is that a part "Pd" of the mechanical power Pm1 provided to the generator (e.g. by the combustion engine) is transferred directly to the rotor of the motor, and only the remaining portion of the power is converted into electrical power via the first and second invertor INV1, INV2. However, because the losses of the mechanical conversion are small and the losses of the electrical conversion are relatively high, the overall efficiency of the system of FIG. 18 is higher than that of FIG. 17, because in FIG. 17 the entire energy is converted from mechanical to electrical and again to mechanical. According to [Hoeijmakers], the efficiency of the system of FIG. 18 is higher than that of FIG. 17 especially when the angular speed $\omega 2$ is close to the angular speed $\omega 1$ of the input shaft. FIG. 18 is a conceptual drawing, but this drawing does not how such a device would physically be constructed.

FIG. 19 shows an Electric Variable Transmission (abbreviated herein as EVT) using the same principles as shown in FIG. 18, but implemented using an arrangement comprising an inner rotor and an outer rotor and a stationary stator, mounted concentrically. The working of this EVT is explained in [Hoeijmakers].

FIG. 20 shows a device 2010 according to an embodiment of the present invention. The device 2010 comprises an EVT, for example similar to the one shown in FIG. 19, and comprises an inner rotor and an outer rotor and a stationary stator, mounted concentrically.

It is pointed out however that the present invention will also work with other EVTs having two rotors and one stator and two mechanical ports and one electrical port. Examples of such other EVT topologies are for example presented in the following documents, each of which is incorporated herein by reference in its entirety:

Y. L. Liu, S. L. Ho, W. N. Fu, X. Zhang, "Design Optimization of a Novel Doubly-Fed Dual-Rotor Flux-Modulated Machine for Hybrid Electric Vehicles", IEEE Transactions on Magnetics, Vol. 51, No. 3, Art. UNSP 8101604, March 2015;

P. Pisek, B. Stumberger, T. Marcic, and P. Virtic, "Design analysis and experimental validation of a double rotor synchronous PM machine used for HEV," IEEE Transactions on Magnetics, vol. 49, no. 1, pp. 152-155, January 2013.

X. Sun, M. Cheng, W. Hua, and L. Xu, "Optimal design of double-layer permanent magnet dual mechanical port machine for wind power application," IEEE Transactions on Magnetics, vol. 45, no. 10, pp. 4613-4616, October 2009.

C. Liu and K. T. Chau, "Electromagnetic design and analysis of double-rotor flux-modulated Permanent-Magnet machines," Progress In Electromagnetics Research, Vol. 131, 81-97, 2012.

S. Niu, S. L. Ho, and W. N. Fu, "A Novel Double-Stator Double-Rotor Brushless Electrical Continuously Variable Transmission System," IEEE Transactions on Magnetics, Vol. 49, no. 7, pp. 3909-3912, July 2013

In the example of FIG. 20, the inner rotor is operatively connected to the movable element via input port "port1" connected to input shaft 2002. The outer rotor is connected to a secondary shaft 2014 via a second port "port2" optionally connected to a flywheel 2009. In the example of FIG. 20, the secondary shaft exits the power split transmission, and is then considered to be an output shaft of the power splitter integrated in the EVT, although the secondary shaft does not necessarily need to extend out of the drive train. The flywheel can be omitted if the inertia of the outer rotor is sufficiently high.

Relative movement of the inner rotor and/or the outer rotor compared to each other or compared to the stator may cause electrical power Pe1 and/or Pe2. The power Pe1 and the power Pe2 are combined in the third port "port3", which is an electrical port. Depending on the power balance, the total power Pe1+Pe2 may be zero even if the mechanical powers differ from zero and if the inner and outer rotor have relative movement to each other and/or to the stator. Alternatively, it can be stated that electrical power applied to the third port "port3" will influence the mechanical powers of the inner rotor and outer rotor as $P_{m1}+P_{m2}+P_{e1}=0$, assuming there are no losses and there is no internal storage.

Without being bound to any theory, the principle of operation of the device shown in FIG. 20 can be understood by means of the following oversimplified description: the movable element causes an oscillating movement of the input shaft 2002, thereby providing mechanical power Pm1 to the input port "port1" of the EVT. A control unit 2005 controls primary invertor INV1 to provide electrical power Pe1 to the slip rings 2016 for influencing a magnetic field between the inner rotor and the outer rotor (acting as an electrical machine). The outer rotor may comprise a plurality of magnets. The control unit 2005 is configured for providing the electrical power Pe1 in such a way that the outer rotor rotates in a single direction, i.e. performs a uni-directional rotation (for example in a manner similar to the auxiliary electric motor described above). The outer rotor is connected to a secondary shaft 2014, which preferably is also connected to a flywheel 2009. The stator comprises a plurality of windings or coils. The inverter INV2 is controlled in such a way that movement of the outer rotor relative to the stator generates electrical power (for example in a manner similar to an electrical generator), allowing the mechanical power to be transformed into electrical power Pe2. The electrical power Pe2 may be in the form of three-phase AC-power (as suggested by the three lines), and may be converted into DC-power by the second invertor INV2. In reality there might be an (electro)magnetic coupling between each of the three elements stator, inner rotor and outer rotor. Due to this (electro)magnetic coupling between all of the three elements a complex electrical machine is realised, it can be considered as a device in which two electrical machines are nested. One of these machines can be considered to be "the main generator", the other machine can be considered to be "the auxiliary electrical machine". Even though it is in principle not possible to decouple these machines, one of these machines is substantially defined by the stator and the outer rotor, while the other machine is substantially defined by the inner rotor and the outer rotor.

The device of FIG. 20 may further comprise a battery 2020, and may further comprise a third invertor INV3 for connection to the power grid. The control unit 2005 may also control said battery 2020, and/or said second invertor INV2 and/or said third invertor INV3.

The device 2013 of FIG. 20 offers many or all of the same advantages as the device 1613 of FIG. 16, in particular in terms of improved efficiency of the generator part, thanks to the unidirectional rotation of the secondary shaft 2014. In addition, the EVT offers the advantage that there is no mechanical wear between teeth of the planetary gears, and possibly also a reduction of related acoustical noise. On the other hand, the device 2013 of FIG. 20 has slip rings which make mechanical contact, but slip rings are much easier to replace than teeth of a gear. Other implementations of the EVT might not exhibit slip rings.

While the EVT presented in [Hoeijmakers] is used to convert mechanical power of one shaft rotating unidirectionally at a first speed $\omega 1$ into mechanical power of another shaft rotating at a second speed $\omega 2$ which can be and typically is different from the first speed, the ratio R of the second and first speed ($R=\omega 1/\omega 2$) being adjustable in a continuous variable way, FIG. 20 shows a device 2013 according to an embodiment of the present invention, wherein the same or a similar EVT is used to convert mechanical energy originating from a movable element that causes the input shaft 2002 to oscillate or to rotate bidirectionally into electrical power Pe_out. While, in that respect the energy flow in [Hoeijmakers] is from the input shaft to the output shaft with the potential to store temporarily some power in the battery through the ports indicated with + and − on FIG. 19, in the device in FIG. 20 the power flow is intended to go from the port 1 to the third port, port 3, and then into the electrical grid or a (large) battery or a battery array or any other form of electrical storage device.

While the hardware of the EVT may be exactly or largely the same as proposed by [Hoeijmakers], the device 2010 of the present invention furthermore comprises a control unit 2005 which is configured in a particular manner, namely for powering the EVT such that the second shaft 2014 rotates in a unidirectional manner, despite the primary shaft performing an oscillating movement. Preferably the control unit 2005 is furthermore adapted for controlling the EVT such that the outer rotor/stator combination works in operating conditions with a high efficiency.

The law of conservation of energy can also be expressed: the sum of the power P1=Pm1 provided to the first port and the power P2=Pm2 provided to the second port and the power P3=Pe3 provided to the third port equals zero at any moment in time (assuming no losses and no storage). The power P1 provided to the power split transmission via the first port can be expressed for example as a torque T1 provided to the input branch 2002 multiplied by the angular speed $\omega 1$ of the input shaft. The power P2 provided to the power split transmission via the second port can be expressed for example as a torque T2 provided to the secondary shaft 2014 multiplied by the angular speed $\omega 2$ of the secondary shaft. The power P3 provided to the control port can be expressed for example as a DC voltage V multiplied by a current I applied to the third port "port 3", which is an electrical port. In the example of FIG. 20 the third port is a two-wire port, because it allows easy connection of a battery, but that is not absolutely required, and it would also be possible to use a three-wire port as the control port.

The device 2013 optionally further comprises a flywheel 2009 connected to the secondary shaft 2014. If present, this helps to reduce the speed variations of the secondary shaft 2014 when operating in regime.

Optionally the device 2013 further comprises a battery 2020 for temporarily storing electrical energy.

Optionally the device 2013 further comprises one or more sensors (not explicitly shown in FIG. 20), such as power sensors and/or voltage sensors and/or current sensors and/or Hall sensors and/or angular speed sensors and/or orientation sensors and/or accelleration sensors, or any other suitable sensors. The control unit 2005 may be adapted for reading one or more of the sensors, and may be adapted for determining (e.g. by measuring and/or by calculating) the power on each of the three ports of the EVT, taking into account for example the law of conservation of energy and characteristics of the device such as for example inertia of the shafts, inertia of the flywheel, etc. to calculate the net amount of energy Pe3 to be injected into the EVT via the third port "port 3" to obtain a desired speed ω2 in the range mentioned above.

The invention claimed is:

1. A device for generating electric energy from a wave motion, the device being connectable to a movable element configured for performing an oscillatory movement under the influence of the wave motion, the device comprising:
a main electric generator,
an input branch operatively connectable to the movable element, the movable element, when connected to the input branch, being configured for imposing an oscillatory movement on the input branch as a result of the wave motion, the oscillatory movement being a periodic movement having a period wherein during alternating moments in time positive and negative speeds are imposed to the input branch,
a secondary branch operatively connected to the main electric generator,
a power split transmission comprising at least three ports, the at least three ports comprising:
a first mechanical port connected to the input branch,
a second mechanical port connected to the secondary branch, and
a third port being a control port,
the power split transmission being configured for distributing power between the at least three ports,
wherein the device furthermore comprises a variable speed auxiliary electrical machine operatively connected to the control port for controlling power distribution in the power split transmission, and
the device furthermore comprises a control unit configured for controlling the variable speed auxiliary electrical machine, in such a way as to realize a one-way rotation of the main electric generator during the whole period of the oscillatory movement.

2. A device according to claim 1, wherein the control unit is configured for controlling power distribution of a positive power flow from the moveable element to the device in one part of a period of the oscillatory movement and of a negative power flow from the moveable element to the device in another part of the period of the oscillatory movement, during operation.

3. A device according to claim 2, wherein said control unit is configured for performing said power distribution to and from any of the at least three ports of the power split transmission so as to shift the moments in time of imposing positive and negative speeds at the input branch with respect to the moments in time when positive or negative power flow from the movable element to the device occurs.

4. A device according to claim 1, wherein the control unit is configured for realising a predetermined torque of the movable element so as to generate the maximum amount of energy during the period of the oscillatory movement.

5. A device according to claim 1, wherein the power split transmission comprises at least one planetary gear box comprising a sun gear, a ring gear and a planet gear.

6. A device according to claim 1, wherein the power split transmission comprises at least one differential unit.

7. A device according to claim 1, wherein the secondary branch comprises at least a mechanical energy storage device adapted for storing at some moments in time mechanical power and for providing at certain moments in time mechanical power.

8. A device according to claim 7, wherein the mechanical energy storage device is a flywheel.

9. A device according to claim 1,
wherein the at least three ports of the power split transmission consist of one input port, one output port and one control port, and
wherein the control unit is configured for extracting power from the movable element during movement of this element in only one direction.

10. A device according to claim 1, wherein the at least three ports of the power split transmission comprise at least one input port, at least one output port and at least two control ports, and
wherein the control unit is configured for controlling the variable speed auxiliary electrical machine for extracting power from the movable element during movement of this element in a substantially upward direction and also during movement of this element in a substantially downward direction.

11. A device according to claim 1, wherein the first mechanical port of the power split transmission is mechanically connected to the input branch of the device; and
wherein the second mechanical port of the power split transmission is mechanically connected to the secondary branch of the device, and the secondary branch is mechanically connected to the main electric generator; and
wherein the third port is a mechanical control port; and
wherein the device furthermore comprises a third branch that mechanically connects the third port of the power split transmission to the variable speed auxiliary electrical machine.

12. A device according to claim 11, wherein said control unit is configured for controlling an auxiliary torque or an auxiliary acceleration or an auxiliary speed of the auxiliary electrical machine for controlling power distribution to and from any of the at least three ports of the power split transmission.

13. A device according to claim 1, comprising an electrical variable transmission comprising said power split transmission and said main electric generator and said variable speed auxiliary electrical machine;
the electrical variable transmission having an inner rotor and an outer rotor and a stator arranged concentrically and being electromagnetically coupled, this electromagnetic coupling realising the main electric generator and said variable speed auxiliary electrical machine; and
wherein the inner rotor is mechanically connected to the input branch of the device and the outer rotor is mechanically connected to the secondary branch of the device, or vice versa; and
wherein the control port of the electrical variable transmission is an electrical port, and wherein the control unit is electrically connected to the variable speed auxiliary electrical machine comprised in the electrical variable transmission for controlling the power distribution in said electrical variable transmission.

14. A device according to claim 13, wherein the device comprises at least one electrical energizing unit.

15. A device according to claim 14, wherein the at least one electrical energizing unit comprises at least one electrical invertor unit.

16. A device according to claim 13, furthermore comprising an electrical battery for temporal storage and retrieval of electrical energy.

17. A system comprising:
a device according to claim 1, and
the movable element of claim 1, connected to the input branch of the device, and optionally further comprising a gearbox operatively connected between the movable element and the input branch.

18. A method for generating electric energy from a wave motion using a device comprising an input branch connected to a movable element configured for performing an oscillatory movement under the influence of the wave motion; and a secondary branch operatively connected to a main electric generator; and a power split transmission comprising at least three ports including a first mechanical port connected to the input branch, a second mechanical port connected to the secondary branch, and a third port being a control port; and a variable speed auxiliary electrical machine operatively connected to the control port of the power split transmission;
the method comprising:
the movable element imposing an oscillatory movement on the input branch as a result of the wave motion, the oscillatory movement being a periodic movement having a period wherein during alternating moments in time positive and negative speeds are imposed to the input branch;
controlling a power distribution in said power split transmission so as to realize a one-way rotation of said main electric generator by controlling said variable speed auxiliary electrical machine.

19. A method according to claim 18, wherein the first mechanical port of the power split transmission is mechanically connected to the input branch of the device; and wherein the second mechanical port of the power split transmission is mechanically connected to the secondary branch of the device, and the secondary branch is mechanically connected to the main electric generator; and wherein the third port is a mechanical control port; and wherein the device furthermore comprises a third branch mechanically connecting the third mechanical port of the power split transmission to the variable speed auxiliary electrical machine; and
the method comprising: mechanically controlling said power distribution by controlling the mechanical control port using said variable speed auxiliary electrical machine for mechanically distributing power in the power split transmission.

20. A method according to claim 18, wherein the device comprises an electrical variable transmission comprising said power split transmission and said main electric generator and said variable speed auxiliary electrical machine;
the electrical variable transmission having an inner rotor and an outer rotor and a stator arranged concentrically and being electromagnetically coupled; and
wherein the inner rotor is mechanically connected to the input branch of the device and the outer rotor is mechanically connected to the secondary branch of the device, or vice versa; and
wherein the control port of the electrical variable transmission is an electrical port, and wherein the control unit is electrically connected to the variable speed auxiliary electrical machine for controlling power distribution in said electrical variable transmission;
the method comprising: electrically controlling said power distribution by controlling the electrical control port using said variable speed auxiliary electrical machine for electromagnetically distributing power in the power split transmission.

\* \* \* \* \*